(12) United States Patent
Di Bari et al.

(10) Patent No.: US 11,437,831 B2
(45) Date of Patent: Sep. 6, 2022

(54) RECHARGE CRADLE FOR OPTICAL INFORMATION READER AND SYSTEM INCLUDING SUCH A CRADLE

(71) Applicant: Datalogic IP Tech S.r.l., Calderara di Reno (IT)

(72) Inventors: Guiseppe Di Bari, Bologna (IT); Manlio Galanti, Persiceto (IT); Davide Gavioli, San Vito di Spilamberto (IT); Mauro Pecorari, Porto Potenza Picena (IT)

(73) Assignee: Datalogic IP Tech S.r.l., Calderara di Reno (IT)

( * ) Notice: Subject to any disclaimer, the term of this patent is extended or adjusted under 35 U.S.C. 154(b) by 316 days.

(21) Appl. No.: 16/619,820

(22) PCT Filed: Jun. 5, 2017

(86) PCT No.: PCT/IT2017/000113
§ 371 (c)(1),
(2) Date: Dec. 5, 2019

(87) PCT Pub. No.: WO2018/225099
PCT Pub. Date: Dec. 13, 2018

(65) Prior Publication Data
US 2020/0106279 A1    Apr. 2, 2020

(51) Int. Cl.
*H01M 10/46* (2006.01)
*H02J 7/00* (2006.01)
(Continued)

(52) U.S. Cl.
CPC .......... *H02J 7/0044* (2013.01); *G06K 7/1413* (2013.01); *H02J 50/10* (2016.02)

(58) Field of Classification Search
CPC ........ H02J 7/0044; H02J 7/0042; H02J 50/10; H02J 50/005; G06K 7/1413
(Continued)

(56) References Cited

U.S. PATENT DOCUMENTS 5,070,293 A    12/1991  Ishii et al.
5,550,452 A    8/1996   Shirai et al.
(Continued)

FOREIGN PATENT DOCUMENTS

| CN | 108602440 A | * | 9/2018 | ............ B60L 53/38 |
| EP | 2722233 A1 | * | 4/2014 | ........... H04B 5/0075 |

OTHER PUBLICATIONS

International Search Report and Written Opinion corresponding to PCT/IT2017/000113, dated Oct. 11, 2017, 13 pages.

*Primary Examiner* — Edward Tso
(74) *Attorney, Agent, or Firm* — Foley & Lardner LLP

(57) ABSTRACT

The present invention relates to a cradle for wireless power recharging of an optical information reader including a first portion containing a power receiving coil to be charged, the cradle including: i) a first seat adapted to partially house the first portion of the optical information reader, the first seat having a plurality of walls, one of the walls being movable from a first operative position held when the first portion of optical information reader is not inserted in the first seat to a second operative position held when the first portion of the optical information reader is inserted in the first seat; and ii) a power transmitting coil located at the movable wall which is adapted to transmit power to the power receiving coil when the optical information reader is inserted in the first seat and the movable wall is in the second operative position.

20 Claims, 27 Drawing Sheets

(51) Int. Cl.
*H02J 50/10* (2016.01)
*G06K 7/14* (2006.01)

(58) Field of Classification Search
USPC .............................. 320/107, 108, 114, 115
See application file for complete search history.

(56) References Cited

U.S. PATENT DOCUMENTS

| | | |
|---|---|---|
| 6,002,765 A | 12/1999 | Frank |
| 6,978,153 B2 | 12/2005 | Davie et al. |
| 8,169,185 B2 | 5/2012 | Partovi et al. |
| 8,373,310 B2 | 2/2013 | Baarman et al. |
| 8,937,454 B2 | 1/2015 | Baarman et al. |
| 9,478,113 B2 | 10/2016 | Xie et al. |
| 9,559,754 B2 | 1/2017 | Holtman et al. |
| 2006/0289654 A1 | 12/2006 | Robinson et al. |
| 2013/0271070 A1* | 10/2013 | Hirano ................ H02J 50/402 320/108 |
| 2015/0178539 A1 | 6/2015 | Gerst, III et al. |
| 2015/0229156 A1 | 8/2015 | Iwabuchi et al. |
| 2015/0349576 A1 | 12/2015 | Krupezevic et al. |

* cited by examiner

RECHARGE CRADLE FOR OPTICAL INFORMATION READER AND SYSTEM INCLUDING SUCH A CRADLE

CROSS REFERENCE TO RELATED APPLICATIONS

This application is a 371 National Stage Application of International Application No. PCT/IT2017/000113 filed Jun. 5, 2017, which is hereby incorporated by reference in its entirety.

The present invention relates to a recharge cradle for an optical information reader, as well as a reading system comprising the recharge cradle.

Bar code readers are generally used to read optical information. In mobile code readers or other battery-operated devices, for example of the hand held type, the battery may need to be charged often. Conventionally, this task is performed by placing the reader on a charging cradle or base station in order to provide energy to the battery when the reader is placed on the charging cradle. The charging cradle may also function as a receiving system for data sent by the reader (e.g., wirelessly) relating to the optical information read by the reader, and/or as a sending system that sends data or instructions to the reader (e.g., from a remote processor-based device). The cradle, usually power supplied by the electrical mains through a cable, also acts as a recharging base of the reader. In order to supply current to the batteries of the reader, the cradle may be provided with electrical contacts that are coupled with electrical contacts of the reader when the latter is placed on the cradle; alternatively current can be supplied from the cradle to the reader via a power transmitting coil in the cradle that is coupled with a power receiving coil in the reader in order to inductively transmit power from the cradle to the battery via the receiving coil. When the reader is hand held for use, and thus removed from the cradle, the recharging of the batteries is interrupted.

It is an objective of the invention to improve existing systems for the inductive recharge of an optical information reader when inserted into a recharging cradle.

Accordingly, in a first aspect thereof, the invention relates to a cradle for inductively recharging an optical information reader including a first portion containing a power receiving coil, the cradle including:
  a first seat adapted to partially house the first portion of the optical information reader, the first seat having a plurality of walls, one of the walls being movable from a first operative position held when the first portion of the optical information reader is not inserted in the first seat to a second operative position held when the first portion of the optical information reader is inserted in the first seat; and
  a power transmitting coil located at the movable wall which is adapted to transmit power to the power receiving coil when the optical information reader is inserted in the first seat and the movable wall is in the second operative position.

In a second aspect thereof, the invention relates to a system to charge an optical information reader, the system including:
  the cradle for wireless power recharging the optical information reader according to the first aspect; and
  the optical information reader including the first portion to be partially housed in the first seat of the cradle, the first portion including the power receiving coil.

Hereinafter in the present description and in the subsequent claims, the expression "optical information" is used for indicating both an "optical code" as better specified below, and optical information stored in an RFID transponder or tag.

An RFID transponder or tag is an electronic component composed of a chip and an antenna. The chip comprises a non-volatile memory containing a unique code. An RFID reader generates an electromagnetic/electric field at an excitation frequency for the RFID transponder which, once entered into such field, transmits a signal containing the unique code towards the RFID reader. An analogous method is used for writing information in the RFID transponder. In the case of a passive RFID tag, the power supply is obtained via induction by the electromagnetic/electric field; the active RFID tags are instead fed by a small internal battery. An RFID tag can have even very small size, such as to permit insertion thereof in labels for commercial products or in credit cards and tickets, so-called "contactless smart cards"

The expression "optical information" is used for indicating any graphical representation having the function of storing information coded by means of suitable combinations of elements of pre-established shape, for example square, rectangular or hexagonal elements, dark coloured (normally black) separated by light coloured elements (spaces, normally white), such as barcodes, stacked codes, i.e. with stacked bar sequences, and two-dimensional codes in general, colour codes, etc., as well as alphanumeric characters and particular shapes or patterns such as stamps, logos, signatures etc. The expression "optical information" also comprises graphical representations detectable not only in the field of visible light, but also in the wavelength range comprised between infrared and ultraviolet.

In the optical information readers of the scanning type, a light beam, in particular a laser beam, suitably focused by appropriate optics, is made to hit a deflection system, generally consisting of a rotating or oscillating mirror, in order to generate one or more scanning lines through the optical code. In the optical information readers of the imager type, the entire optical code is simultaneously illuminated. The light diffused by the code is collected by suitable optics and conveyed onto a photodetector element, which converts its intensity into an electrical signal. The distribution of the electrical signal over time during the illumination of the optical code by means of the scanning line, or the distribution of the electrical signal in space in case of illuminating the entire optical code, is indicative of the presence or absence, as well as relative size and possibly colour, of the elements composing the optical code. By means of such electrical signal, appropriately processed, it is therefore possible to acquire the optical code and decode the information coded therein.

A hand held optical information reader is generally gun shaped and comprises a reading head portion provided with a light input and output window and a holdable handle, possibly provided with a trigger-type activation push-button and possibly other control push-buttons.

The optical information reader preferably houses, suitably arranged between the head and the handle, the light source, the emitting and receiving optics, the possible deflection and/or scanning mirrors and the photodetector, as well as one or more rechargeable batteries intended for supplying power to the same.

The optical information reader can moreover house electronics for pre-processing the photodetector output signal, electronics for code acquisition and possibly for decoding the optical code, recharging circuits of the batteries, one or more memories, as well as a communication interface for transferring the electric signal output by the photodetector or the acquired optical code or also the decoded optical code, as well as for receiving setting commands and possibly remote-activation commands.

The optical information reader is associated with a so-called cradle, which in addition to acting as a support base for placing the optical information reader when not in use, can also be used for the collection of raw or already processed data from the reader and for transferring such data to a remote processor, and for transmitting configuration parameters to the reader.

Cradle and optical information reader form a system.

The cradle includes at least a seat, called first seat, in which a first portion of the optical information reader is partially housed when the optical information reader is positioned onto the cradle. The first seat has therefore a given geometry and defines one or more walls which surround a part of the optical information reader when the latter is inserted in the first seat. The geometry of the seat is thus defined by the position of its walls. Preferably, the first seat includes a bottom surface, onto which the first portion of the optical information reader abuts, and one or more lateral walls delimiting the bottom surface and extending from the same. One of the walls of the first seat is a movable wall.

The charging performed by the cradle is a wireless charging. Inductive charging (also known as wireless charging) uses an electromagnetic field to transfer energy between two objects through electromagnetic induction. This is usually done with a charging station (for example, in this case, the cradle). Energy is sent through an inductive coupling to an electrical device, which can then use that energy to charge batteries or run the device.

Induction chargers use an induction coil to create an alternating electromagnetic field from within a charging base, and a second induction coil in the portable device takes power from the electromagnetic field and converts it back into electric current to charge the battery. The two induction coils in proximity combine to form an electrical transformer.

This type of charging is known in the art and not further detailed. In order to perform such a charging, the optical information reader includes a power receiving coil and the cradle includes a power transmitting coil. Power transmitting coil and power receiving coil represent the induction coils above described. The power receiving coil is positioned in the first portion of the reader. The power transmitting coil is housed in a portion of the cradle in proximity to the first seat, as better detailed below.

The proper alignment of the two coils, power transmitting and power receiving coils, one in the reader and one in the cradle, is important to guarantee an adequate charging efficiency. In order to obtain a correct positioning of the first portion of the reader, housing the power receiving coil, with respect to the portion of the cradle, housing the power transmitting coil, according to the invention, the cradle is provided with a movable wall connected with the power transmitting coil.

Preferably, in order to obtain a proper coils' alignment, the power receiving coil in the optical information reader is kept still, while the power transmitting coil, positioned in a portion of the cradle—a movable wall—is moved with respect to the optical information reader to obtain the desired alignment.

The movable wall is apt to be moved from a first operative position held when the first portion of optical information reader is not inserted in the first seat to a second operative position held when the first portion of the optical information reader is inserted in the first seat. In other words, the movable wall, with its movement, allows a good relative positioning of the two coils for a good efficiency in charging.

The first operative position of the movable wall preferably allows an easy insertion of the first portion of the optical information reader into the first seat, while the second operative position preferably allows a good alignment of the two coils in the movable wall and first portion.

The movable wall is a wall of the first seat housing the first portion of the reader. The movable wall is preferably one of the lateral walls of the optical information reader and it is incident to the bottom surface of the first seat. Thus, moving the movable wall from the first to the second position changes the geometry of the first seat. Preferably, in the second position, the movable wall is closer to the optical information reader, and in particular preferably to the power receiving coil, than in the first position. The movement from the first to the second operative position of the movable wall may be seen as a movement towards the optical information reader.

Preferably, the movement from the first to the second operative position is substantially "automatic", that is, it takes place due to the insertion of the first portion of the reader into the first seat without additional tasks or actions to be performed by a user. For example, the movement from the first to the second operative position could be caused by the weight of the reader.

With this solution in which a movable wall is used to align the two coils, the alignment of the coils is greatly facilitated without relying on tight mechanical tolerances that ultimately lead to a more difficult insertion of the optical information reader into and extraction of the optical information reader from the first seat.

In the first or in the second aspect, the invention may include in alternative or in addition, one or more of the following characteristics.

Preferably, in its second operative position, the movable wall of the cradle may be adapted to be in contact with the first portion of the optical information reader including the power receiving coil. More preferably, the movable wall of the cradle is adapted to be aligned with a part the first portion of the optical information reader housing the power receiving coil. For example, in the second operative position, the receiver and power transmitting coil are substantially in abutment. This provision may further improve energy coupling between the two coils.

Advantageously, one of the first portion of the optical information reader and the movable wall may include a magnet and the other of the first portion of the optical information reader and the movable wall may include a metal element so that the movement of the movable wall from the first to the second operative position is due to magnetic attraction. Magnetic attraction may make the reaching of the second operative position automatic upon insertion of the optical information reader into the first seat, lessening the need for manual alignment, and providing an additional retaining force (the magnetic attractive force keeping the movable wall attached to the first portion of the optical information reader) that reduces the risk of the optical information reader losing its correct position when the operator's hand is not supporting the reader in its charging position any longer.

Preferably, the movement from the first to the second operative position may include a rotation of the movable wall, or a translation of the movable wall within the first seat, or a combination thereof. The movement between the first and second operative position of the movable wall may be a rotation, for example the movable wall may rotate around an axis so that it can change an angle formed between the movable wall and a base portion of the cradle, or a translation, in which the movable wall shifts within the first seat. The movement of the movable wall may also be a roto-translation.

Advantageously, the first seat may include a bottom surface to which the first portion of the optical information reader is in abutment when the optical information reader is inserted into the first seat and wherein the movable wall is rotatable around an axis parallel to the bottom surface. An angle formed between the movable wall and the bottom surface moving from the first to the second operative position changes amplitude. In the first operative position the angle is wider, so that insertion of the optical information reader into the first seat is relatively easy, while the angle is narrower in the second operative position, so that the movable wall "restricts" movements of the optical information reader while charging. This provision gives to the first seat a tapered or funnel shape towards the bottom surface when the movable wall is in its first operative position, which greatly facilitates insertion of the optical information reader into the first seat.

The movable wall may be hinged to the cradle, which the simplest actuation mechanism to perform the movement from the first to the second operative position.

Preferably, the cradle may include: a base plate on which the optical information reader is apt to be positioned, the base plate including the first seat; a slidable element connected to the base plate so that the base plate and the slidable element move from a first unloaded position when the optical information reader is not on the cradle to a second loaded position when the optical information reader is on the cradle; and an actuator adapted to rotate or translate the movable wall, the slidable element being connected to the actuator so that the movable wall is rotated or translated from the first to the second operative position when the base plate and slidable element are moved from the first unloaded position to the second loaded position. The weight of the optical information reader may be the trigger for the movement of the movable wall from the first to the second operative position. In order to use the weight of the reader as the trigger for the movement, a base plate, such as a "tray-like" element, is provided to partially house the optical information reader and move according to the weight of the latter. The base plate is connected to a slidable element and an actuator which are preferably actuated when the base plate is moved. When the reader is not positioned on the base plate of the cradle, the base plate is in a "rest" or unloaded position: the slidable element is unloaded and the actuator connected to the movable wall is not actuated. When the reader is positioned onto the cradle, that is, onto the base plate, its weight causes the base plate and the slidable element to move to the loaded position and actuate the actuator, which in turn moves the movable wall to the second operative position. In this way, a retaining force moving the movable wall is generated with purely mechanical means, for example without the need of any magnetic elements; in some environments the presence of magnets could interfere with equipment nearby or, for high inductive currents, with the energy transfer mechanism between the coils. The slidable element may also include a spring to bring back the sliding element to its unloaded position when the reader is removed from the base plate. Advantageously, the range of the movement of the base plate and of the slidable element may be calibrated depending on the weight of the optical information reader. Therefore, the base plate and slidable element may have different responses depending on the model of the reader.

More preferably, the slidable element can be realized as a lever sliding in a first inclined hollow seat, the lever ending with a pin constrained to move along a second inclined hollow seat. The relative inclination of the first and second hollow seats is for example chosen so as to produce a force component in the direction of sliding of the second hollow seat sufficient to move the actuator. The pin may be made to protrude externally to the cradle so as to realize a hand actuatable lever. This provision allows to manually operate the actuator when the cradle is mounted in a vertical or nearly vertical position where the force component along the second sliding direction is not sufficient to move the actuator.

Preferably, the cradle may include a snap in element, said snap in element being connected to the movable wall, the movement from the first to the second operative position of the movable wall being triggered by an actuation of the snap in element. A portion or a part of the snap in element may be positioned in proximity or at the first seat, so that it protrudes at least partially in the first seat. In the absence of the optical information reader from the first seat, the snap in element and the spring are in a resting position. When the optical information reader is inserted into the seat, the portion or part of the snap in element which was protruding inside the first seat is pushed away due to the presence of the optical information reader's body. The snap in element is pushed towards the optical information reader to apply a pressure against the same. This pressure allows stabilizing the position of the optical information reader inside the first seat in case the cradle is positioned vertically or tilted with respect to a horizontal plane.

More preferably, the snap in element includes a spring and a lever.

The spring may be loaded when the reader is inserted into the cradle, so as to release energy when the optical information reader is lifted from its rest position and thus facilitate removal. At the beginning of the removal, the reader offers resistance due to the spring's pressure, however as soon as a given position of the spring is overcome, the spring brings back the movable wall to the first operative position.

The cradle may include one or more proximity sensors to detect the vicinity of the optical information reader and an electrically driven actuator connected to the movable wall, the proximity sensor being apt to send signals to the electrically driven actuator to initiate the movement of the movable wall from the first to the second operative position when the optical information reader approaches the cradle.

The proximity sensors may be chosen among the group of: Hall effect sensors, optical sensors, micro switches, inductive and magnetic sensors.

The cradle may include a capacitive sensor for detecting the presence of a user's hand; the hand presence sensor is preferably placed in a portion of the cradle facing the reader handle portion. For example, the cradle may include a first and a second seat to partially house a first and a second portion of the optical information reader, and the capacitive sensor is located preferably approximately midway between the first and second seat.

The cradle may include a reader placement detection system configured to compare signals from the one or more proximity sensors and/or the hand presence sensor and report a presence, proper docking, or impending undocking of the reader based on such comparison.

The movable wall may be connected to a spring mechanism, said spring mechanism being in a first and second stable configuration in both the first and second operative positions of the movable wall, said spring mechanism reaching a loaded configuration where it is biased to return to the first or second stable configuration, said loaded configuration being reached when moving from the first to the second stable configurations, or vice-versa, due to the movable wall change from the first to the second operative position, or vice-versa. In this way, the optical information reader when docketed experiences a pressure caused by the movable wall pressed by the spring towards the first portion. This pressure keeps the first portion of the reader inserted in the first seat. When the optical information reader is removed from the first seat, a first resistance is present, and then the undocking is facilitated by the spring action which pulls the movable wall back to its first operative position. The movement of the spring mechanism is preferably as follows: the spring biases the movable wall in the first operative position. When the movable wall is moved into the second operative position, the spring has to overcome in its trajectory a resistance point. In the trajectory up to this resistance point, the spring pushes the wall back to its first position. After the resistance point, the spring pushes the wall towards the second position. When the second position is reached, the spring keeps the movable wall in the second position and thus for example it applies a pressure on the optical information reader to keep the latter in place.

The movable wall may include a hook element and the optical information reader a corresponding concavity, so that in the second position of the movable wall, the hook is housed in the concavity to stabilize a coupling between the power transmitting and power receiving coils. The movable wall keeps the reader in place, in particular in case of vertically oriented or tilted cradle. The hook may have any form, as well as the concavity.

The cradle may include a second seat to house a second portion of the optical information reader, wherein the second portion may be a portion of a handle of the optical information reader, and the first portion is a portion of the head of the optical information reader. The presence of two seats is helpful to avoid movements of the reader when located in the cradle, minimizing the movement of the optical information reader, housing both its extremities.

The second seat may include a plurality of walls, one of the walls of the second seat being movable from a first operative position when the second portion of the optical information reader is not inserted in the second seat to a second operative position when the second portion of the optical information reader is inserted in the second seat. The second movable wall preferably does not include any coil. This second movable wall is preferably used to avoid or minimize movements of the optical information reader when docketed, in particular in vertically positioned cradles.

The second seat may comprise a second slidable element connected to the base plate so that the second slidable element moves from a first unloaded position when the optical information reader is not on the cradle to a second loaded position when the optical information reader is on the cradle; and a second actuator adapted to rotate or translate the second portion movable wall, the second slidable element being connected to the second actuator so that the second movable wall is rotated or translated from the first to the second operative position when the second slidable element is moved from the first unloaded position into the second loaded position. In a single movement, that is, the docking of the reader onto the base plate, both first and second movable walls move from the first to the second operative position due to the weight of the reader acting on the base plate and first and second slidable elements. Preferably, the first and second slidable elements may coincide and form a single element.

This second slidable element can be realized as the first slidable element above described.

The first and/or second seat may include a magnet or a metallic element and the first and/or second portion of the optical information reader may include a corresponding metallic element or magnet. The reader when inserted in the first and/or second seat is substantially "blocked" therein by the magnetic attraction. Further magnets and/or metallic elements may be present in other portions of the cradle and/or optical information reader. The number of magnets and metallic elements depends on the desired stability of the optical information reader in the cradle (for example, if the cradle needs to be moved often or it is subjected to impacts, then an higher stability and thus higher magnetic coupling is desired).

The cradle may include an electrically driven actuator to move the movable wall from the first to the second operative position or vice-versa. More preferably, the electrically driven actuator is chosen among the group comprising an electro-magnet, an electric motor, a stepper linear motor. The movable wall may be moved from the first to the second operative position—or vice-versa—not only thanks to the weight of the reader, but also by means of an electrically driven actuator. The electrically driven actuator may be energized for example by signals sent by a sensor or by signals sent by a control unit.

The cradle may include a control system adapted to detect the presence or absence of the first portion of the optical information reader in the first seat. More preferably, the control system may be adapted to detect the presence or absence of the second portion in the second seat. The control system may include a plurality of sensors and a control unit. The control unit may elaborate the signals coming from the sensors. Those signals may indicate the presence or absence of an object in a determined location of the cradle. Each sensor therefore preferably controls a given volume of the cradle. The control system may emit warning or output information, for example by means of lights or acoustic devices, to show the status of the cradle and in case anomalies are present.

The second seat may be adapted to partially house a second portion of the optical information reader, and the control system may be adapted to detect the presence or absence of the second portion of the optical information reader in the second seat.

In a third aspect thereof, the invention lies in a cradle for an optical information reader, the optical information reader including a first portion having a power receiving coil, the cradle including:
- a stationary base part including a wall housing a power transmitting coil which is adapted to inductively transmit power to the power receiving coil when the first portion of the optical information reader is inserted in a first seat;
- the first seat apt to partially house the first portion of the optical information reader, the first seat having a plurality of seat walls;
- a base plate comprising the first seat, the base plate being adapted to move with respect to the stationary base part from a first operative position held when the optical information reader is not inserted in the seat to a second operative position held when the optical information reader is inserted in the first seat, said movement from the first to the second operative position being caused by the action of the weight of the optical information reader on the base plate; and a biasing element movable from an unloaded position when the optical information reader is not inserted in the first seat to a loaded position when the optical information reader is inserted in the first seat, and for restoring the base plate to its first operative position when the optical information reader is lifted from the first seat.

In a fourth aspect, the invention relates to a system of a cradle and an optical information reader, the system including:

the optical information reader including a first portion including a power receiving coil; and the cradle for wireless recharge of the optical information reader, according to the third aspect.

Differently from the first and the second aspect, in this case a base plate which supports the optical information reader when docketed, base plate which includes a first seat, moves in order to better align the power transmitting and the power receiving coils, while the power transmitting coil remains still with respect to the cradle. In other words, in this aspect, the optical information reader housing the power receiving coil moves when the optical information reader is positioned in the first seat in order to align with the power transmitting coil, which remains stationary. The movement of the base plate including the first seat is triggered by the weight of the reader. For example, the base plate has a "tray-like" form and it can shift downwards or it may rotate, or it may perform a roto-translation when the reader is positioned onto it. The weight of the reader causes the base plate to move, for example to shift of a given amount or to rotate of a given angle. The range of the movements can be for example calibrated and selected depending on the optical information reader used (e.g. it may depends on the reader's weight) and whether the cradle is to be positioned vertically or horizontally.

The base plate has therefore two different positions. The two positions are as follows: a first position which is held when the optical information reader is away from the cradle, and a second position held when the optical information reader is on the cradle. When the optical information reader is further removed from the cradle, the base plate is biased in such a way that the base plate returns automatically to the first position. In other words, the base plate is preferably biased to go back to its first position by means of a biasing element.

Preferably, the base plate is rotatably connected to the cradle. Alternatively or in addition, the base plate is slidably connected to the cradle. Being the movement from the first to the second position due to the weight of the reader, preferably the movement is "simple" and it is purely mechanical.

More preferably, the slidable connection is a four bar linkage mechanism. The movement of the base plate is thus preferably a rotation, a translation or a roto-translation.

Preferably, the first seat is apt to partially house a head portion of the optical information reader. Due to the geometry of the reader, which is generally "bigger" at the head portion, so there is the necessary volume to house the coil, preferably the power receiving coil is housed on the head of the reader and thus at least a portion of the head is housed in the first seat to be in proximity of the power transmitting coil housed in a wall of the first seat.

More preferably, the base plate includes a second seat apt to partially house a handle portion of the optical information reader. Preferably, the cradle includes a second seat to partially house a second portion of the optical information reader. Preferably this second portion is an end portion of the reader opposite to the head. This configuration is preferred when the cradle is positioned vertically or in a tilted fashion, so that the reader cannot slip outside the cradle when positioned in the seats.

Preferably, the wall housing the power receiving coil is located at a boundary of the first seat. In order to properly align the receiver and power transmitting coils, the wall housing the power transmitting coil is at the boundary of the first seat which partially houses the head of the reader where the power receiving coil is located.

More preferably, the wall housing the power receiving coil is a geometrical continuation of one or more seat wall of the first seat. Movements of the base plate including the seat still keep this geometrical continuation due to the limited extension of the movement.

The invention will be now described with non-limiting reference to the appended drawings, in which.

Figure 1:
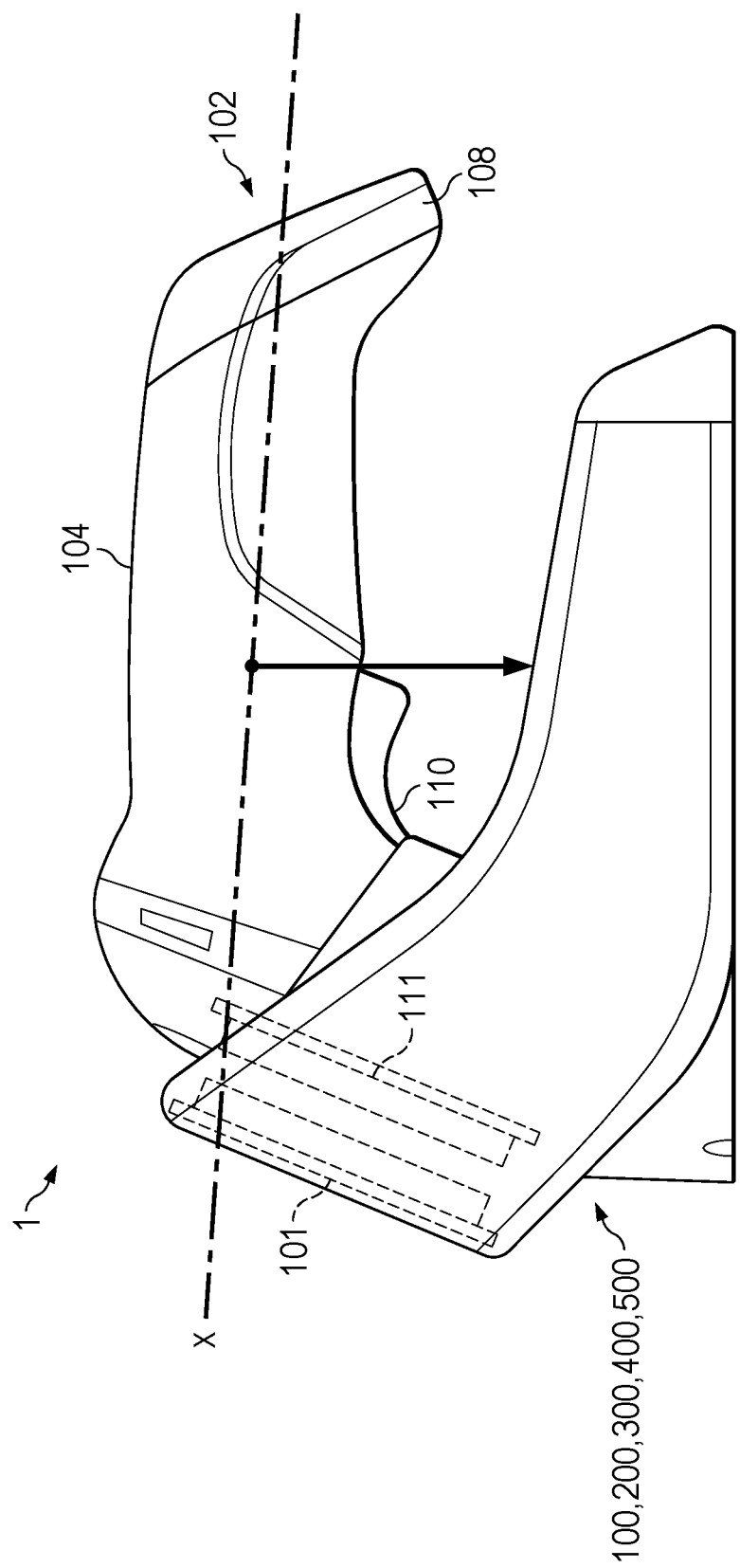
FIG. 1 is a lateral view of a system of cradle and optical information reader realized according to the present invention.

FIG. 1 shows a base station or charging cradle and a handheld code optical information reader 102, forming a system 1. The optical information reader 102—reader for short in the following—is used to read an optical code, not depicted in the appended drawings. Different embodiments of the system 1 will be detailed with reference to the additional appended figures.

In some implementations, the cradle 100 may also include at least one wired or wireless communication interface that facilitates communication with the reader 102. Communication may occur by way of the contacts (not depicted), but may also occur via infrared, via radio and in other modes, in which case the cradle 100 houses a receiving, transmitting or transceiving antenna, or receiving, transmitting or transceiver device, corresponding devices being provided in the reader 102. The cradle 100 may in such a case act as a raw or processed data collector, such data being related to the optical information detected by the reader 102. The cradle 100 may in such a case provide for a memory for such information, processing and/or decoding electronics of the same and/or a communication interface with a remote processor-based device. Additionally, the communication with the remote processor may occur via cable, not depicted, or via infrared, via radio or, in other modes, corresponding devices may be provided for in the cradle 100.

By way of the communication interface(s), the cradle 100 may send configuration parameters to the reader 102, set via a user interface (also not shown) of the cradle 100 itself, or may forward configuration parameters of the reader set in a remote processor-based device.

The user interface, known per se, may also include one or more acoustic and/or luminous indicator devices, such as a buzzer, speaker, LED and/or a display, signaling that charging is underway, that acquisition is underway, that data transmission is underway, diagnostics and the like. The user interface may also include one or more push buttons or other input devices for enabling or disabling such acoustic and/or luminous indicator devices, or for implementing other functionality.

The reader 102 may house pre-processing electronics of the photodetector output signal, electronics for code acquisition and possibly for decoding the optical code, one or more memories, as well as a communication interface for transferring the electrical signal output by a photodetector or the acquired optical code or also the decoded optical code, as well as for receiving setting commands and possibly remote-activation commands. The communication may occur by means of an electrical interface, or via radio, via infrared or other corded or cordless type communication interface.

The communication interface of the reader 102 may be coupled with the suitable communication interface of the cradle 100, or it may be directly coupled, optionally in wireless mode, with an interface of a remote processor-based device.

The reader 102 may, alternatively or additionally, read and/or write radio frequency identification (RFID) tags or transponders via radiofrequency. In such a case, the reader 102 includes a subsystem for generating an electromagnetic/electric field at an excitation frequency for an RFID transponder and a receiving, transmitting or transceiving antenna for receiving and/or transmitting a signal containing a code stored in an RFID tag. When implemented as an RFID reader, the reader 102 may also include processing and/or decoding electronics of such signal and possibly one or more memories, as well as a communication interface, analogous to the optical code reader.

In all the illustrated embodiments, the reader 102 is gun-shaped and includes a first portion, for example comprising a reading head 104, which for example may include a light input/output window 106 (only slightly visible in FIG. 2), and a second portion connected to the first, for example a holdable handle 108 which may be provided with a trigger-type activation push-button 110 and possible other control push-buttons (not shown). A longitudinal axis X of the reader can be defined connecting two axially opposed ends of the reader, e.g. running from the head 104 to the handle 108. Different shapes of the reader 102, not depicted, may be used as well.

In the case of an optical code reader (e.g., one-dimensional or barcode symbol reader, two dimensional or matrix symbol reader), the reading head 104 may be provided with the light input and output window 106 and the reader 102 houses, appropriately arranged preferably in the head 104, a light beam emitting source, emitting and receiving optics, and a photodetector, as well as possible scanning mirrors of the light beam emitted by the light source and/or mirrors for deflecting such light beam towards the window 106 and/or for deflecting the light diffused by the optical code entering from the window 106 onto the photodetector.

Further, the reading head 104 includes a power receiving coil 111 apt to be charged by a power transmitting coil 101 in a wireless manner. Power receiving coil 111 is preferably extending substantially perpendicular to the longitudinal axis X of the reader 102. Transmitter and power receiving coils are not visible from the outside of cradle 100 and reader 102, however in FIG. 1 they are shown for clarity reasons in order to depict their relative positioning.

Figure 2:
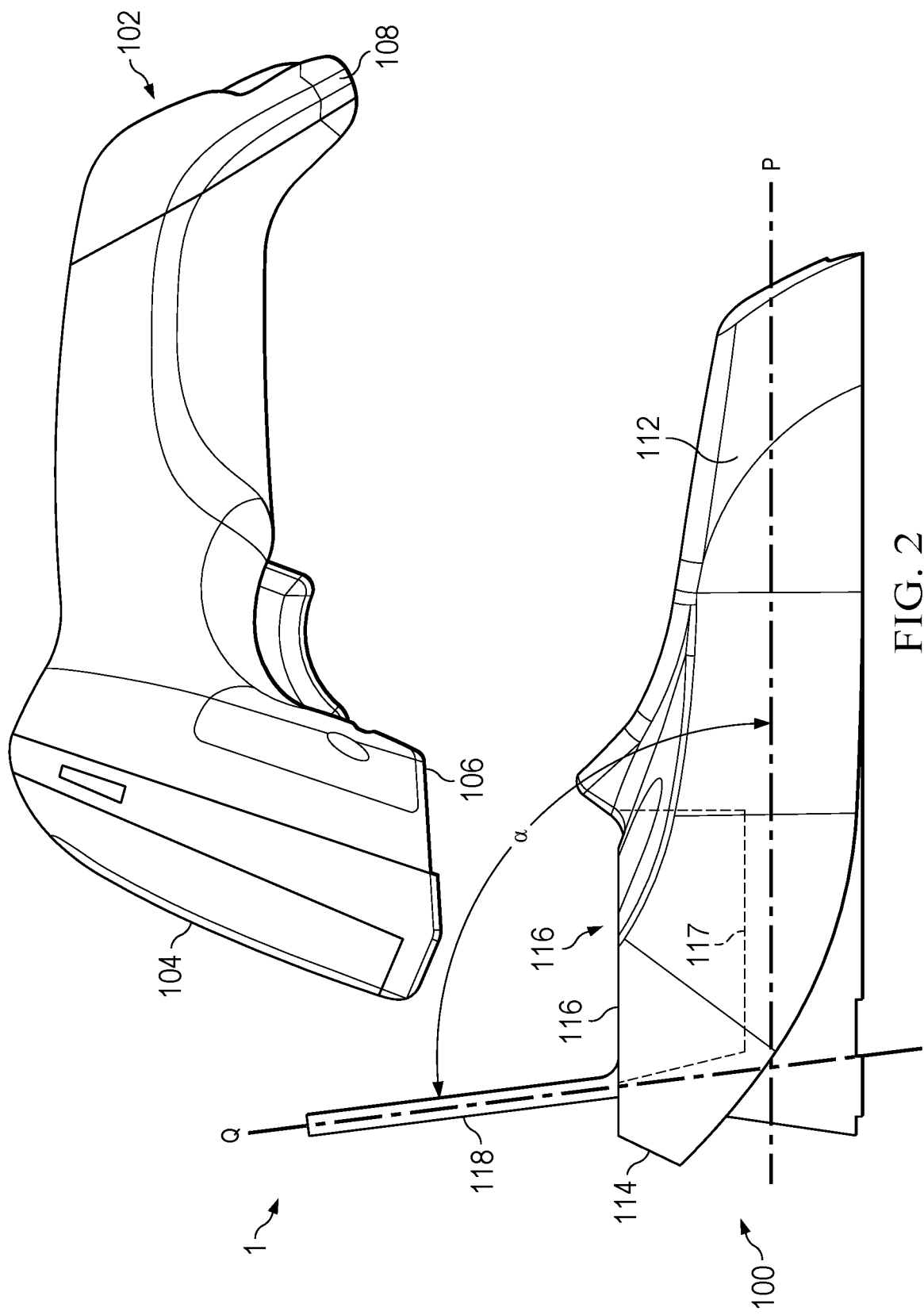
FIG. 2 is a lateral view of a first embodiment of the system of FIG. 1 in a first operative position.
Figure 3:
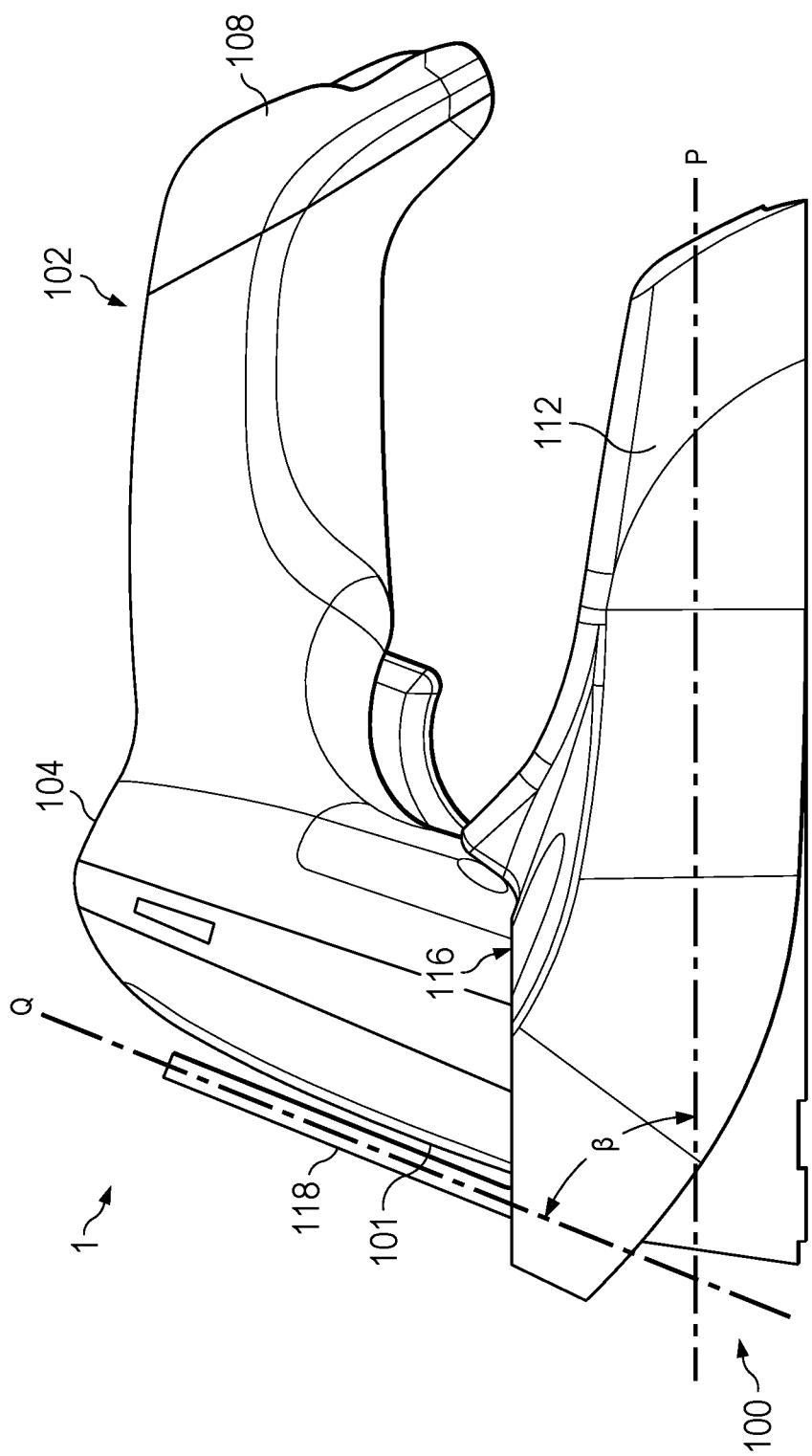
FIG. 3 is a lateral view of a first embodiment of the system of FIG. 2 in a second operative position.
Figure 4:
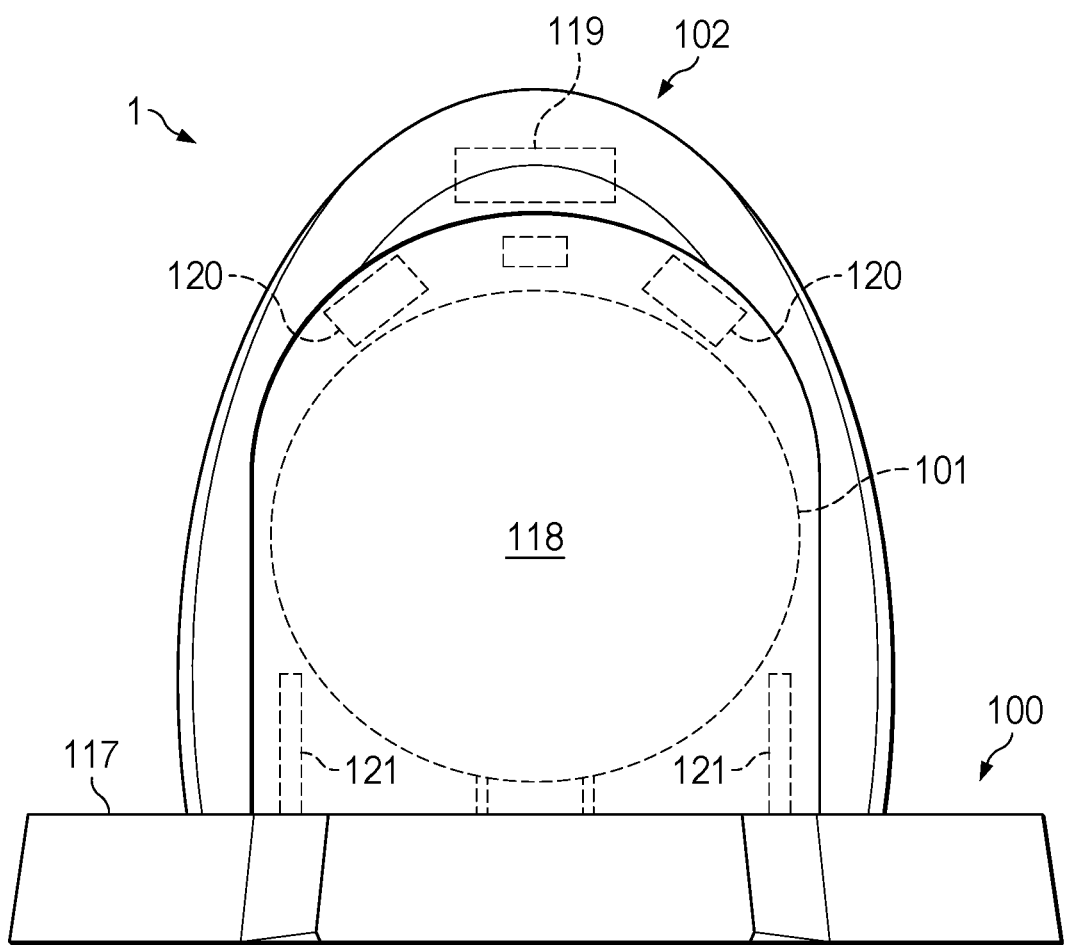
FIG. 4 is a front view of a first embodiment of the system of FIG. 2 or 3 in the second operative position.

In a first embodiment of the system 1 depicted in FIGS. 2-4, the cradle 100 includes a base part or base portion 112 defining a first seat 116. First seat 116 has a bottom surface 117 which is surrounded by walls 114. Among the walls 114 surrounding the first seat 116, a movable wall 118 is present, which is disposed upright and forms an angle with the bottom surface 117. Movable wall 118 houses power transmitting coil 101 used to recharge power receiving coil 111 housed in the head 104 of the reader 102 in a manner known in the art and not further described below. The power transmitting coil 101 may be located within the movable wall 118, or attached to any surface of the same. The geometry of the first seat 116 is such that it can house a portion of the reading head 104, that is, the geometry of the first seat 116 is such that the walls 114 and 118 surrounds the head 104 when the reader is positioned on the cradle 100. A portion of the head 104 can thus be inserted in the first seat 116.

Although in the depicted embodiments the cradle of system 1 is arranged horizontally, that is, base part 112 as well as bottom surface 117 are substantially horizontal, the cradle can be oriented vertically or inclined with respect to a horizontal or vertical plane.

In detail, the movable wall 118 is movable from a first position depicted in FIG. 2, when the reader 102 is away from the cradle 100, to a second position depicted in FIG. 3 held when the reader 102 is positioned on the cradle.

In the first position of FIG. 2, the movable wall 118, which is preferably hinged onto the base part 112, forms an angle α with a plane P passing through the bottom 117 of the first seat which is preferably obtuse (see FIG. 2—the plane P is parallel to the bottom surface 117). In FIG. 2 plane Q is a plane defined by the movable wall 118. In this way, the insertion of the head 104 of the reader 102 into the first seat 116 is not hindered by the presence of the movable wall 118.

When the reader 102, i.e. the reading head 104, is inserted in the first seat 116, the movable wall 118 rotates around an axis, till it abuts against a surface of head 104, reaching the second operative position. The new angle β formed between the movable wall 118 (plane Q) and the plane P is smaller than the angle α which was formed between planes P and Q in the first position. The axis around which the movable wall 118 rotates is preferably parallel to the bottom surface 117 of the first seat 116. The new angle β can be for example an acute angle. In this second position, as depicted in FIG. 3, the movable wall 118 which includes power transmitting coil 101, becomes closer to and better aligned with power receiving coil 111 located within head 104. Further, the geometry of the first seat 116 changes, the entrance of the first seat being now less wide than in the first position due to the movement of the wall towards the reader. The movable wall 118 substantially exerts a gripping force onto the reader 102.

Movable wall 118 may be hinged onto base portion 112 or base portion and movable wall may be connected by means of a rubber lip (not visible in the drawings).

Further, as shown in FIG. 4, movable wall 118 includes at least a magnet 120, for example two magnets (both indicated with 120). The first and second magnets 120 could be located in a periphery of the movable wall 118, for example close to an external rim of the movable wall 118.

The reader 102, in particular at its head 104, includes a metal piece 119 so that, when the reader 102 is positioned partially in the first seat 116, the magnetic attraction of magnets 120 and metal piece 119 moves the movable walls forwards from the first position of FIG. 2 to the second position of FIGS. 3 and 4.

Preferably, the cradle 100 includes at least a spring, preferably two springs, both indicated with 121. Springs 121 preferably connects the movable wall 118 with the base portion 112 and bias the movable wall 118 towards its first position. In other words, springs 121 force the wall 118 to go back to its first operative position of FIG. 2 as soon as the reader 102 is removed from the cradle 100. The removal of the reader from the cradle 100 pushes the movable wall 118 towards the first operative position and this movement is facilitated by the springs' action.

In use, when the reader 102 is not docketed in the cradle, for example because it is used to read optical information, the cradle 100 and movable wall 118 are in the position of FIG. 2, where the movable wall 118 forms an obtuse angle α with the bottom surface 117 of the seat 116 and insertion of the reader 102 into the seat 116 is facilitated. When the reader 102 does not need to be used any more to read optical information, it is docketed in the cradle 100, inserting a portion of the head 104 into the first seat 116. The insertion causes proximity between magnets 120 and metal element 119 so that the movable wall 118 moves forward the reader 102, reaching the second position of FIGS. 3 and 4. The movement is a rotation around an axis. The power receiving and power transmitting coils 111, 101—after the described movement—are aligned and a proper wireless charging can take place.

As soon as the reader 102 is removed from the cradle 100, the movable wall 118 is pushed away due to the extraction of the reader 102 from the seat 116 and the movable wall 118, thanks to the bias of springs 121, returns to the first position of FIG. 2.

Figure 5:
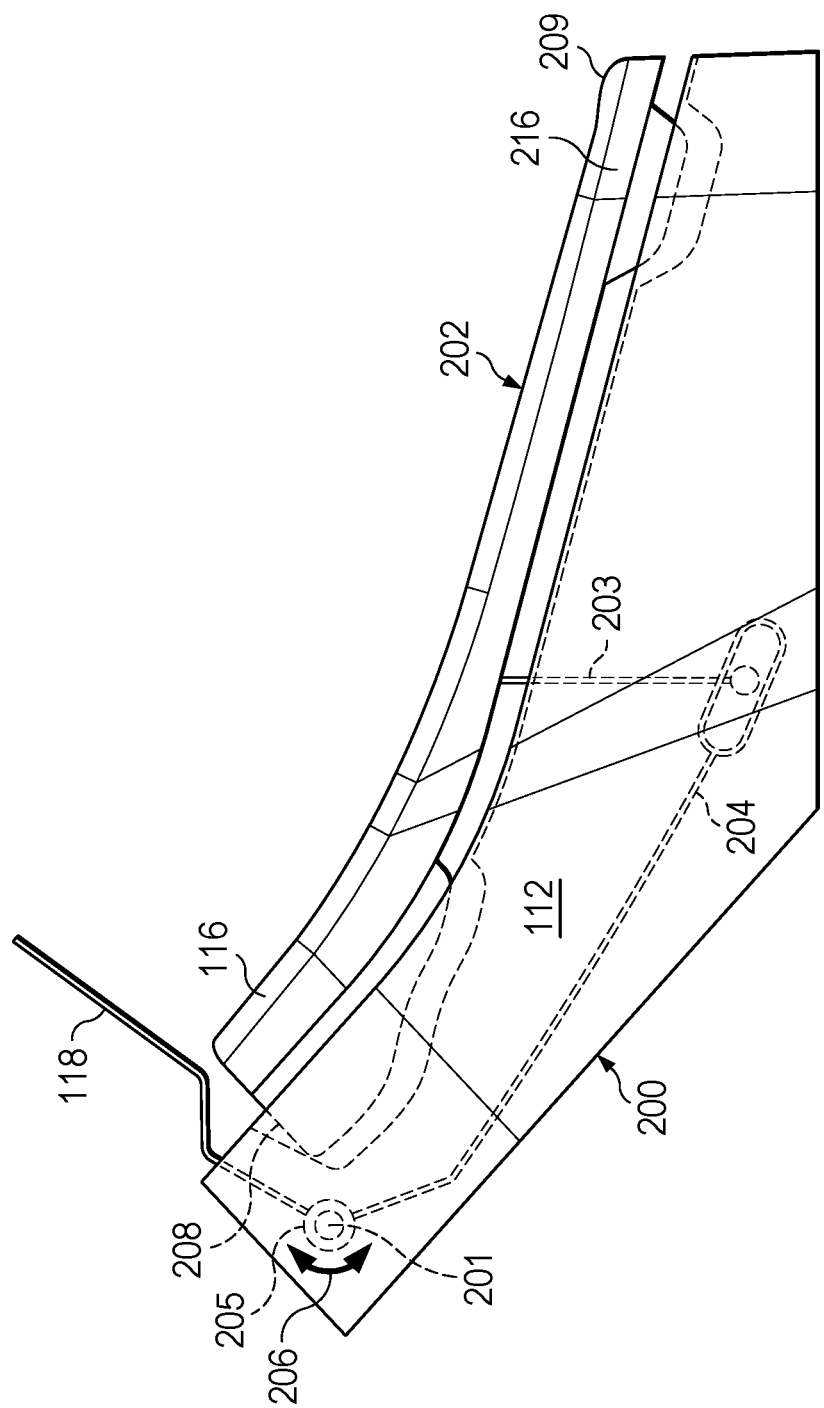
FIG. 5 is a lateral view of a second embodiment of the system according to the invention in a first operative position.
Figure 6:
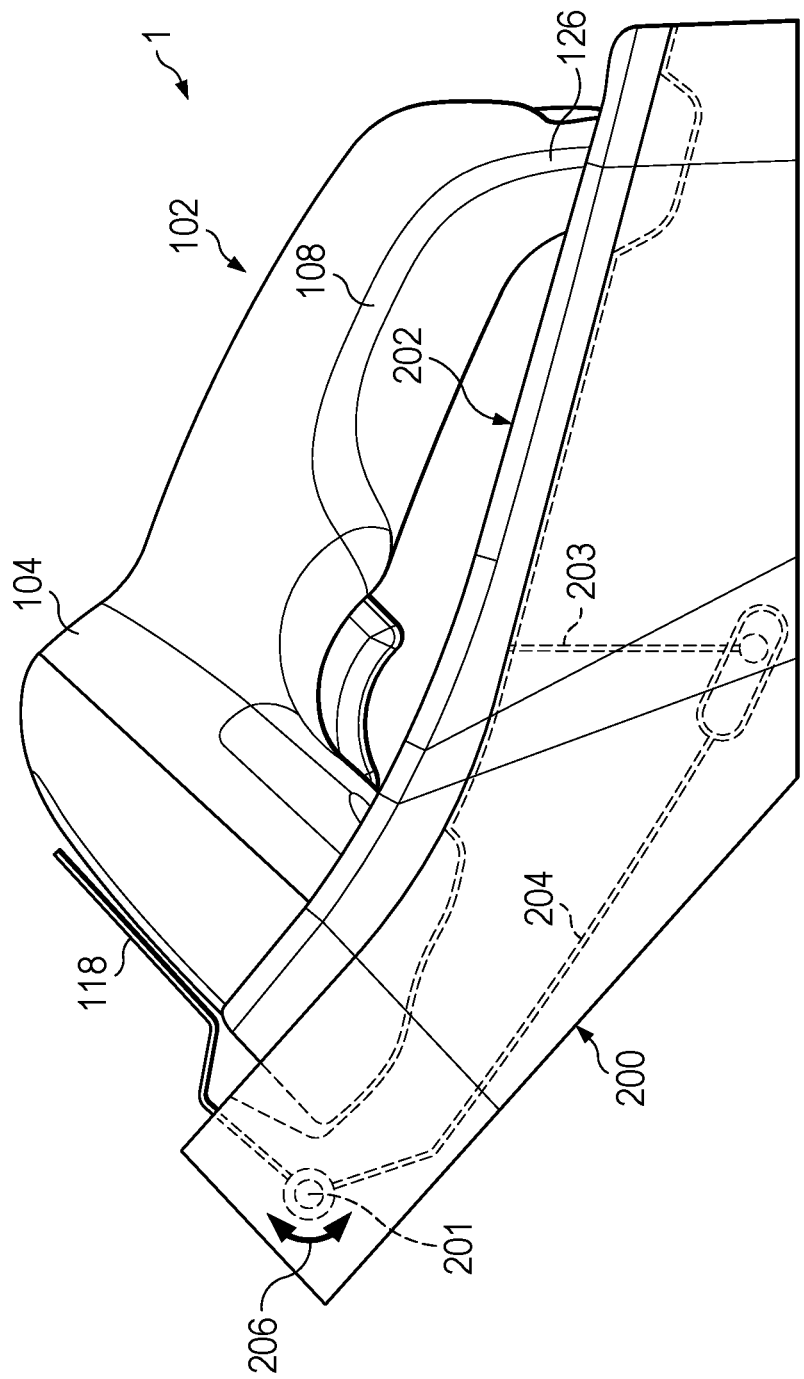
FIG. 6 is a lateral view of the second embodiment of the system of FIG. 5 in a second operative position.

In a second embodiment of FIGS. 5 and 6, a different embodiment of cradle 200 is disclosed. Elements identical to those described in the previous embodiment are referred to with the same numerals.

The cradle 200 includes the fixed base part 112 and a base plate 202. The base plate 202 defines a first and a second end 208, 209. The first end 208 includes first seat 116 formed as a recess suitable to receive the head 104 of the reader 102, for example to receive in abutment the head 104 of the reader 102. At the second end 209 opposite the first end 208, the base plate 202 includes a second seat, formed also as a recess 216, suitable to receive a second part of the reader, for example a terminal portion 126 of the handle 108 of the reader 102. The first seat 116 and the second seat 216 form a housing for the reader 102.

The lower portion 126 of the handle 108 of the reader 102 is so shaped to be inserted in the second seat 216 of the base plate 202 of the cradle 200, and the head 104 is so shaped to be inserted in the first seat 116 of the base plate 202 of the cradle 200. Due to the curved shape of the base plate 202 of the cradle 200 and/or to the gun shape of the reader 102, when the reader 102 is inserted in the first and second seat 116, 216 of the cradle 200, the handle 108 is spaced for a portion from the base plate 202 of the cradle 200 and is therefore easy to grip.

Movable wall 118 housing power transmitting coil 101 is rotatably attached to the fixed base part 112 of the cradle 200. The wall may rotate around axis 201 which is preferably parallel to a plane on which the cradle is positioned. The axis 201 is located in the fixed base part of cradle 200. The rotation movements are depicted with an arrow 206 in FIGS. 5 and 6. Although the movable wall 118 is separated from the seat 116 (the first seat is positioned on the base plate, the movable wall on the fixed base part 112), it still forms part of the same, because the movable wall 118 together with the rest of first seat 116 defines the housing for the first portion 104 of the reader, in particular in the second operative position of the movable wall, where the movable wall defines a confined geometry for the reader touching the head 104 and "closing" the entrance to the first seat 116.

Cradle 200 further includes a spring 205 connected to the movable wall 118 and preferably centered onto the rotational axis 201. The rotation of the movable wall 118 around rotatable axis 201 causes loading or unloading of the spring 205. When the movable wall 118 is in the first operative position (reader 102 not in the cradle) as depicted in FIG. 5, the spring 205 is unloaded. When the rotatable wall 118 moves to the second operative position, where the reader 102 is positioned on the base plate 202 of the cradle 200, as depicted in FIG. 6, the rotational movement loads the spring 205. The spring 205 therefore applies a force to the movable wall to pull it back towards the first operative position.

The base plate 202 is movable from a first unloaded position depicted in FIG. 5 held when the reader 102 is not on the base plate 202, to a second loaded position depicted in FIG. 6 held when the reader 102 is positioned on the cradle 200. The base plate 202 can move from the first to the second position due to the force applied by the reader 102 on it (the weight of the reader is the force) when positioned on the base plate 202. The base plate 202 due to the weight of the reader 102 shifts. The shift can be for example a downwards shift. The shift can be a linear movement. In case of a horizontally arranged cradle 200 as depicted in the drawings 5 or 6, the shift of the base plate is a vertical shift. However, in case the cradle is positioned differently, such as vertically or tilted, the shift can be also along a different axis, such as vertical.

The base plate 202 is connected to a slidable element 203, for example a shaft sliding within a hollow seat, which is in turn connected to an actuator 204. The actuator is connected to spring 205 connected to movable wall 118. The actuator 204 transforms the linear movement of the slidable element 203 into a rotational movement of the movable wall 118. That is to say, the slidable element 203 in its movements 204—forced by the movements of the base plate 202—moves the actuator 204 which rotates the movable wall 118. The positions of the movable wall and of the base plate, and thus of the slidable element, are connected to each other. The movement of one of these elements triggers the movements of the others.

When the base plate 202 is in the first unloaded position of FIG. 5, the slidable element 203 is also in a first unloaded position and the movable wall 118 is in the first operative position. The docking of the reader 102 into the cradle 200, inserting a part of the head 104 in the first seat 116 as well as the end of the handle 108 in the second seat 216 triggers the movement of the base plate 202 shifting linearly and moving the slidable element 203 to the loaded position. This in turn activates actuator 204 which rotates spring 205 and thus in turn also the movable wall 118 rotates to the second operative position (see FIG. 6).

Power receiving coil 111 positioned in the head 104 is thus aligned with the power transmitting coil 101 positioned in the movable wall 118.

In this second position, spring 205 is compressed, so that, when the reader 102 is removed from base plate 202, the movable wall returns to its first operative position. Base plate 202 also returns to the elevated position.

As described with reference to the first embodiment of cradle 100, in the first position of the movable wall in FIG. 5, the angle (not shown) formed between the movable wall 118 and the bottom surface 117 (not visible in FIGS. 5 and 6) of the first seat 116 is wider than the angle formed between the movable wall 118 and the bottom surface 117 in the second position of the movable wall. In this second position, the geometry of the seat is modified and the movable wall 118 "closes" the entrance of the first seat 116 abutting onto the head 104.

The presence of the second seat 216 is preferred in particular when the cradle 200 is positioned vertically or inclined with respect to a horizontal plane.

Figure 7A:
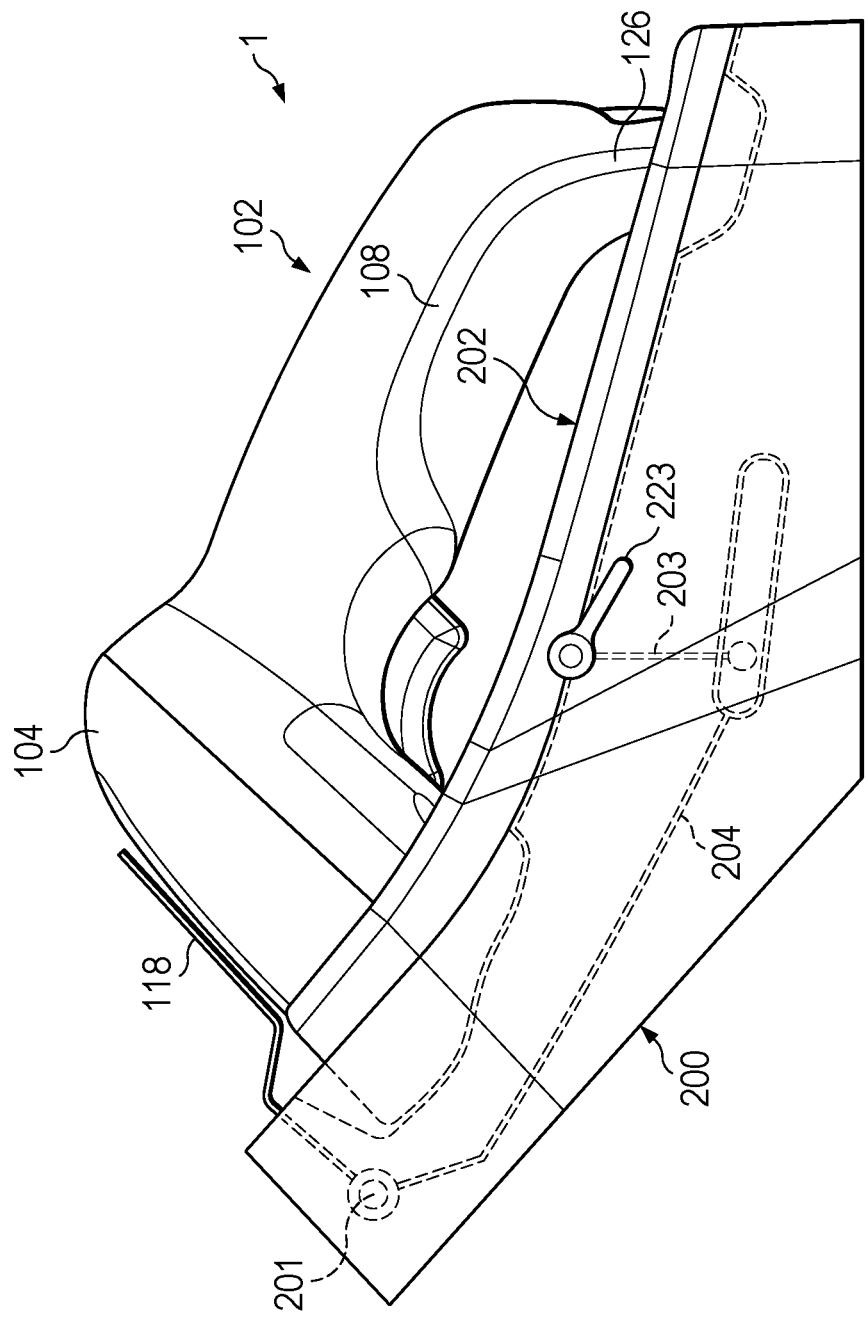
FIG. 7a is a lateral view of a first variant of the second embodiment of the system of FIGS. 5 and 6 in a first configuration.
Figure 7B:
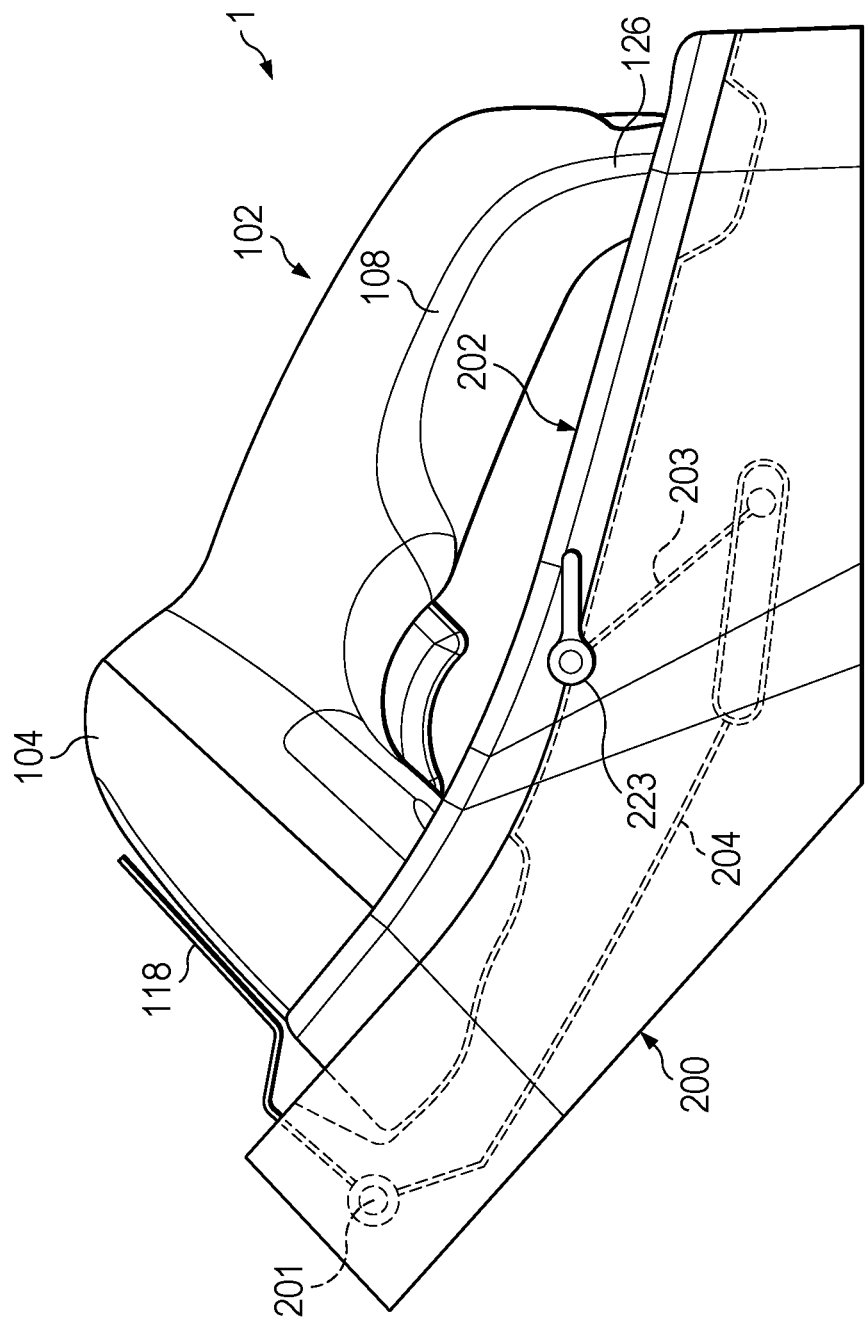
FIG. 7b is a lateral view of the first variant of FIG. 7a in a second configuration.

With now reference to FIGS. 7a and 7b, a variant of the system is shown. The system 1 includes an external actuator, such as lever 223, which operates on slidable element 203. Lever 223 may be hinged to the fixed base part 112 of the cradle 200 and is rotatable around an axis. The lever 223 enhances the effect of the weight of the reader 102 so that the movable wall 118 can be easily moved also in case the cradle is not positioned horizontally. The lever may be rotated in different positions (see FIGS. 7a and 7b where the lever is in two different positions) and can be operated by a user by hand. The configuration of 7a is the one preferred when the cradle is horizontal, while the configuration of FIG. 7b is preferred when the cradle is substantially vertical. In the latter case, a "weak" force generates a relevant shift and then rotation.

Figure 8:
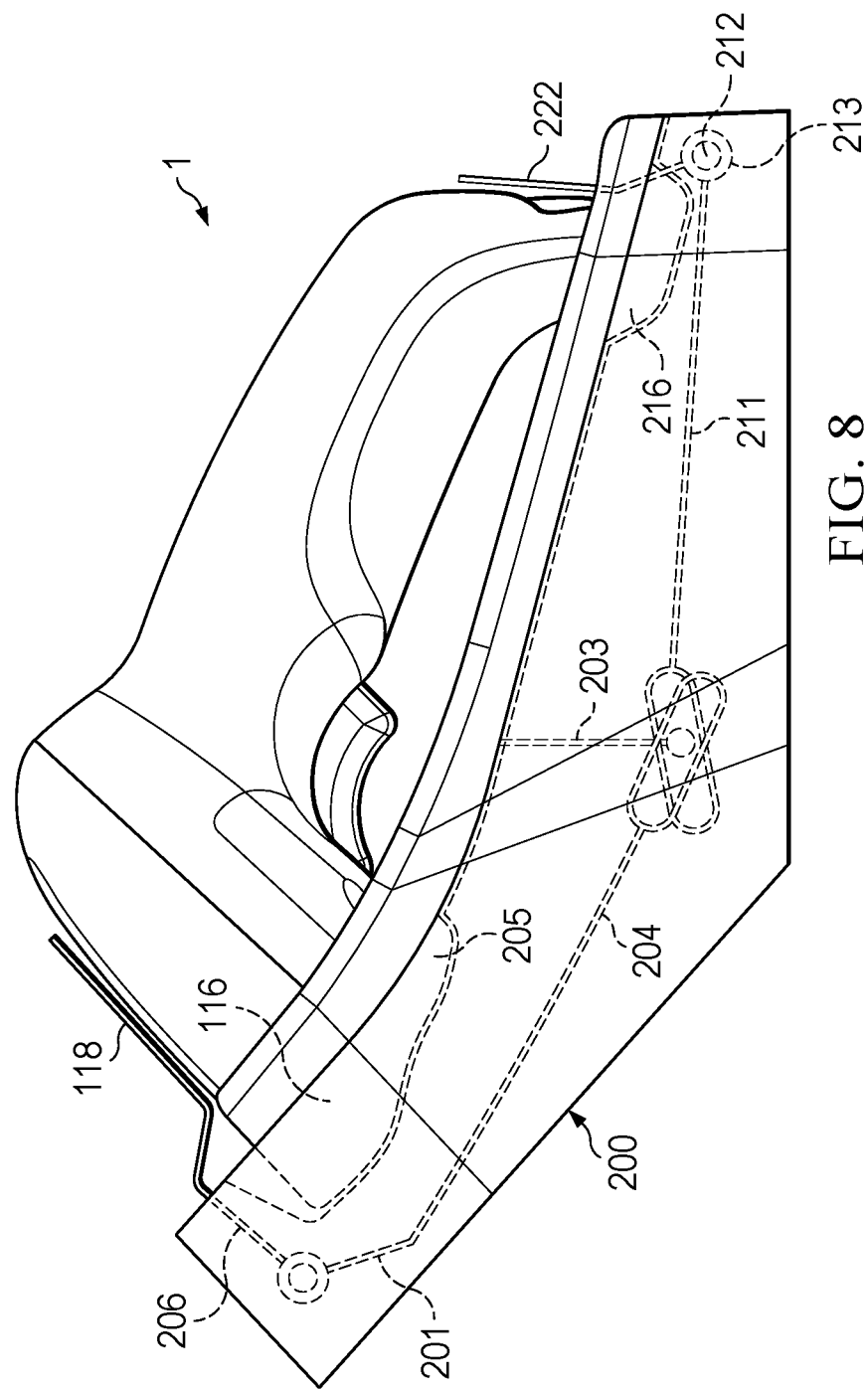
FIG. 8 is a lateral view of a second variant of the second embodiment of the system of FIGS. 5 and 6 in a second operative position.

In the second variant of the second embodiment depicted in FIG. 8, the cradle 200 includes a second movable wall 222. The second movable wall 222 preferably does not contain a coil. The second movable wall 222 is one of the walls of the second seat 216. The second movable wall 222, as the first movable wall 118, may be moved from a first position in which is away from the reader 102 and forms an angle with the bottom surface of the second seat 216, position held when the reader is not positioned on the cradle, to a second operative position when the reader 102 is positioned in the cradle 200. In the second position, the second movable wall 222 is in abutment to the handle 108 of the reader. The movement from the first to the second position of the second movable wall 222 modifies the geometry of the second seat 216. In FIG. 8, only the second position of the second movable wall is depicted.

In its movement, the second movable wall 222 rotates around an axis 213, for example parallel to the rotatable axis 201 of the first movable wall 118.

The second movable wall 222 returns in the first operative position when the reader 102 is removed from the base plate 202, and the handle 108 is removed from the second seat 216.

The base plate 202 is—as already described—connected to slidable element 203, which is in turn connected to first actuator 204 and in this case also to a second actuator 211. The actuators 204, 211 transform the linear movement of the slidable element 203 into rotational movements of the movable wall 118 and of the second movable wall 222. That is to say, the slidable element 203 in its movement moves the actuators 204, 211 which rotate the movable walls 118, 222. When the base plate 202 is in the first unloaded position (no reader on the base plate), the slidable element 203 is also in a first unloaded position and the movable walls 118, 222 are in their respective first operative positions. When the base plate is shifted into the second loaded position, the slidable element is also in the second loaded position and the movable walls 118, 222 are moved in the second operative position.

Cradle 200 further includes a spring 212 connected to the second movable wall 222 and preferably centered onto the rotational axis 213. The rotation of the second movable wall 222 around rotatable axis 213 causes loading of the spring 212. When the second movable wall 222 is in the first operative position (reader 102 not in the cradle), the spring 212 is unloaded. When the second movable wall 222 moves to the second operative position, because the reader is positioned on the base plate 202 of the cradle 200, the movement loads the spring 213. The spring therefore applies a force to the second movable wall 222 to pull it back towards the first operative position.

The movements of the first and second movable walls 118, 222 from the first to the second position, and vice-versa, take place at the same time as soon as the reader 102 is docketed/removed from the cradle 200, due to the shift of the base plate 202.

Figure 9:
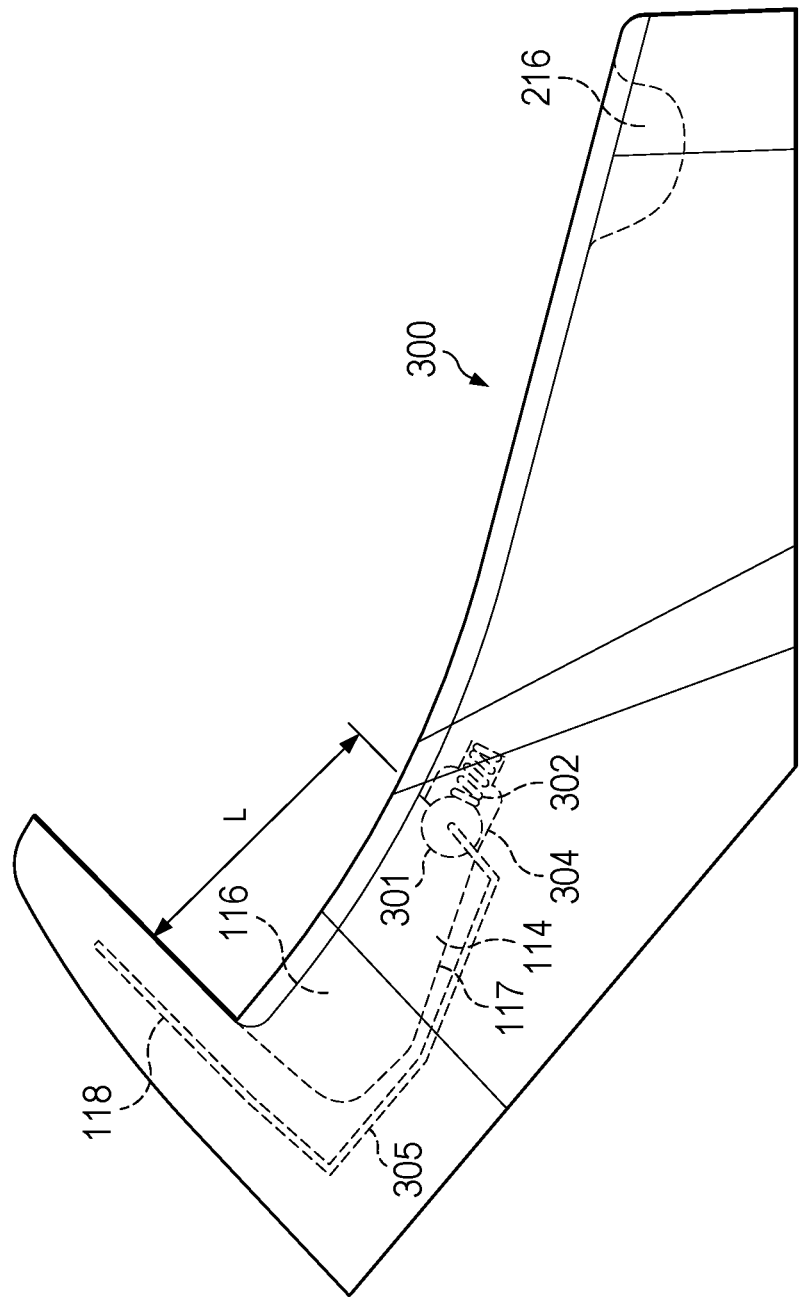
FIG. 9 is a lateral view of a third embodiment of the system according to the invention in a first operative position.
Figure 10:
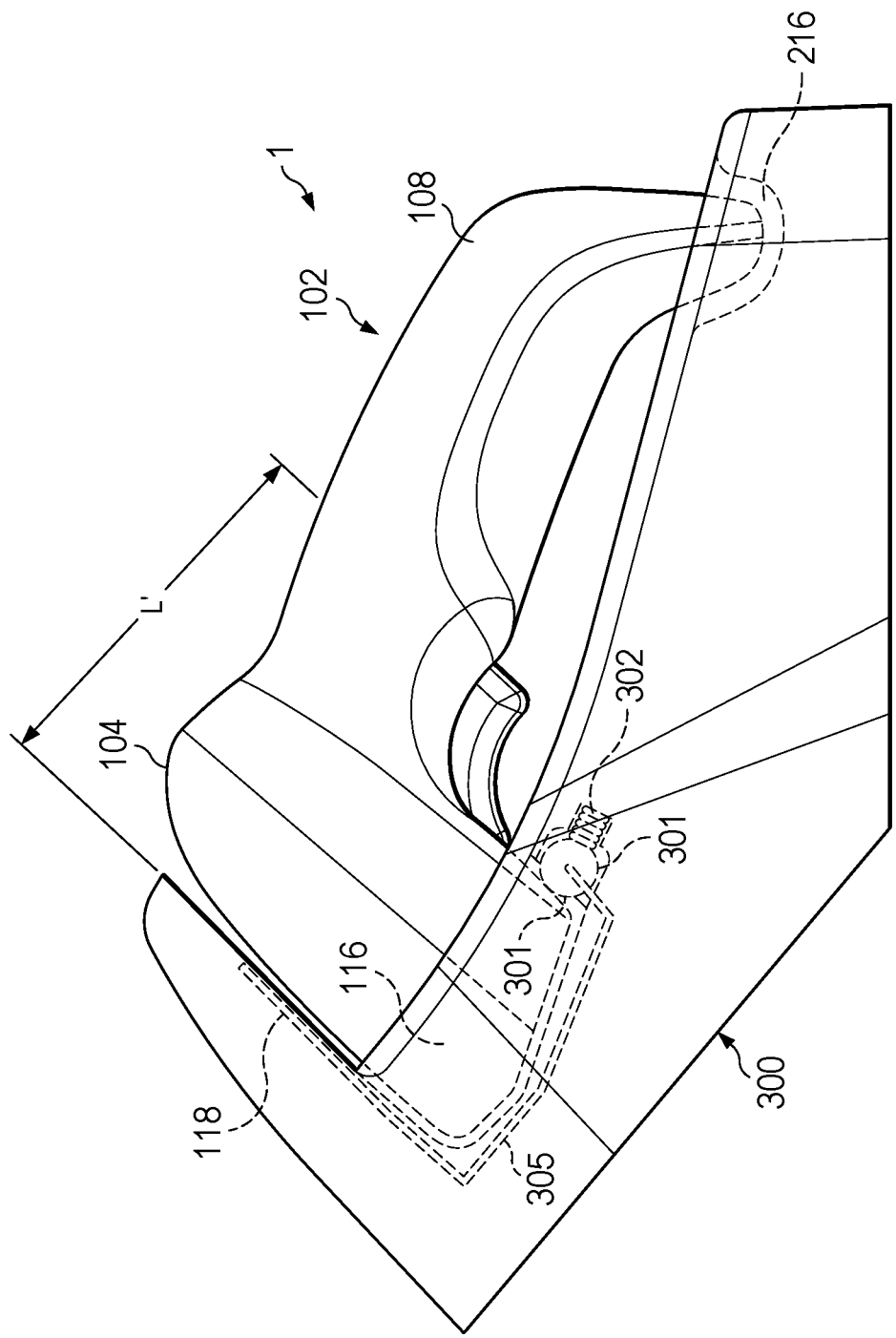
FIG. 10 is a lateral view of the third embodiment of the system of FIG. 9 in a second operative position.

In a third embodiment of the invention, depicted with reference to FIGS. 9 and 10, the system includes cradle indicated with 300.

The cradle 300 includes a base part or portion 112 defining a first seat 116. First seat 116 has a bottom surface 117 which is surrounded by walls 114. Among the walls 114 surrounding the first seat 116, a movable wall 118 is present, which is disposed upright and forms an angle with the bottom surface 117. This angle is preferably fixed Movable wall 118 houses power transmitting coil 101 used to recharge power receiving coil 111 housed in the head 104 of the reader 102 in a manner known in the art and not further described below. The power transmitting coil 101 may be located within the movable wall 118, or attached to any surface of the same. The geometry of the first seat 116 is such that it can house a portion of the reading head 104, that is, the geometry of the first seat 116 is such that the walls 114 and 118 surrounds the head 104 when the reader 102 is positioned on the cradle 300.

In detail, the movable wall 118 is movable from a first position depicted in FIG. 9, when the reader 102 is away from the cradle 300, to a second position depicted in FIG. 10 held when the reader 102 is positioned on the cradle 300.

In the first position of FIG. 9, the movable wall 118 delimits the first seat 116 so that the latter has a certain length L. This length is wide enough to allow an easy insertion of a portion of the head 104 of the reader 102 in the first seat 116.

When the reader 102, i.e. the reading head 104, is inserted in the first seat 116, the movable wall 118 translates on the bottom surface 117 of the first seat 116 reducing the length of the same to a length L'<L (see FIG. 10) and entering in abutment to the head 104 of the reader 102. In this second position, as depicted in FIG. 10, the movable wall 118 which includes power transmitting coil 101, becomes closer and better aligned with power receiving coil 111 located within head 104. Further, the geometry of the first seat 116 changes, because the wall 118 reduces the size of the first seat itself.

In order to obtain the translation of the movable wall 118, the first seat 116 includes an actuating element 301, such as a wheel in the depicted embodiment, connected to a spring 302. The wheel 301 is positioned at the boundaries of first seat 116, at one of the walls 114, and is apt to slightly move if pushed towards the wall 114. More in detail, a recess 304 is formed in the wall 114 where the wheel can enter if pushed. If partially entering in the recess 304, the wheel compresses spring 304 which exerts a force towards the wheel to push the latter again out in the first seat 116. The spring 302 is connected to a slidable element 305, which is in turn connected to movable wall 118. The slidable element 305 is brought into sliding by the compression of the spring 302 and it brings the movable wall 118 into translation towards the head 104 of the reader 102.

When reader is not inserted in the first seat 116, the spring 302 is in an unloaded position, the slidable element 305 is also in a first unloaded position and the movable wall 118 is in the first operative position of FIG. 9. The first seat 116 has its widest length L. When the reader 102 is inserted into the first seat 116, the wheel 301 is pushed in the recess 304 and the spring 302 is compressed. The slidable element 305 is shifted into the second loaded position, moving by translation the movable wall 118 in the second operative position shown in FIG. 10.

In this second position, the head 104 is compressed and retained by the combined action of the presence of the movable wall 118 on one side and the spring 302 and the wheel 301 on the other side. The wheel is forced against the head 104 by the elastic force of the spring 302, restraining the same. This allows the positioning of the cradle also with a vertical or inclined orientation.

Figure 11:
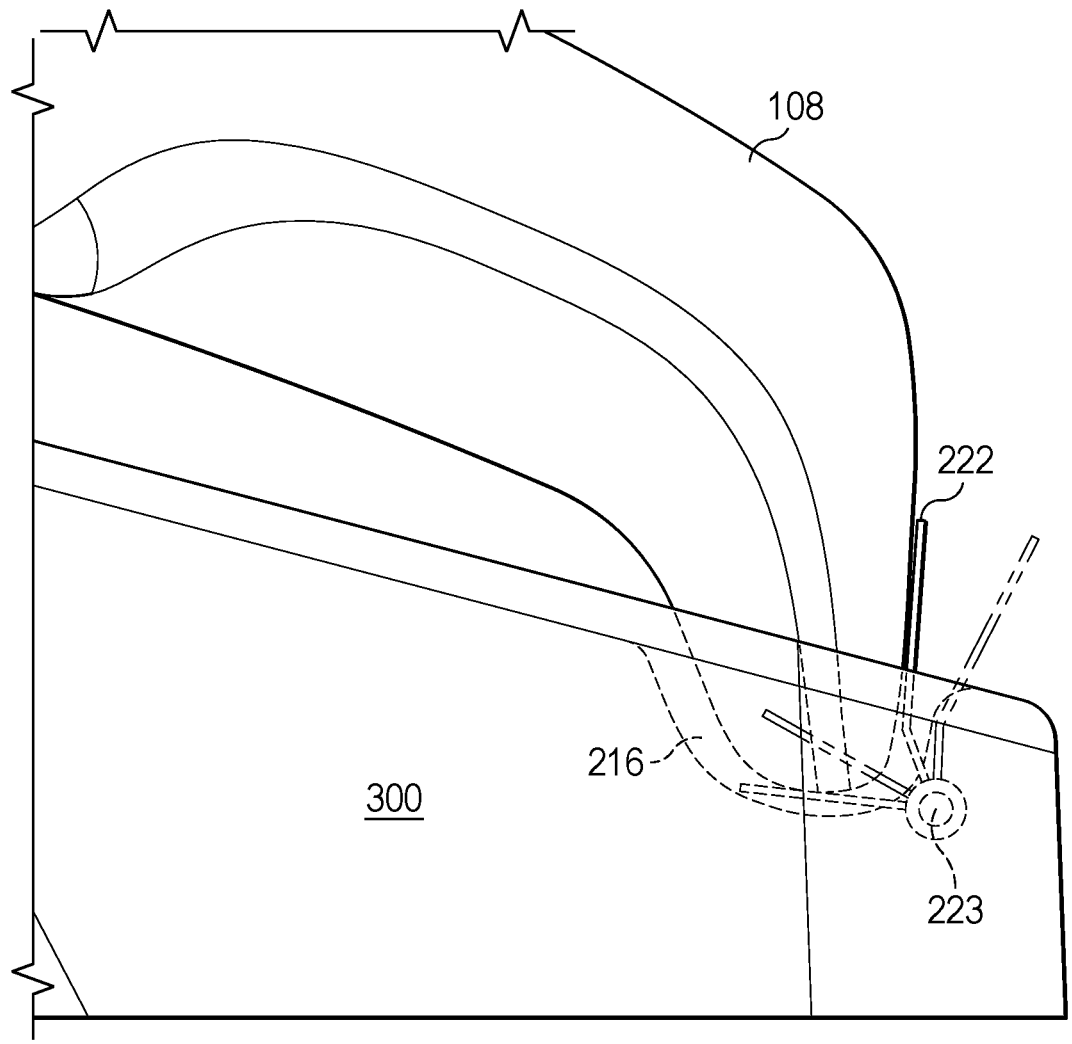
FIG. 11 is a lateral view of a first variant of the third embodiment of the system of FIGS. 9 and 10 in a second operative position.

In a variant of the third embodiment depicted in FIG. 11, the cradle 300 includes second seat 216 and a second movable wall 222. The second seat 216 is apt to house partially a portion of the handle 108. The second movable wall 222 preferably does not contain a coil. The second movable wall 222, as the first movable wall 118, may be moved from a first position in which is away from the second seat, e.g. the entrance of the second seat is broad, position held when the reader is not positioned on the cradle, to a second operative position when the reader 102 is positioned in the cradle 300. In the second position, the second movable wall 222 is in abutment to the handle 108 of the reader. The movement from the first to the second position of the second movable wall 222 modifies the geometry of the second seat 216.

The second movable wall 222 is preferably rotated around an axis 223. The mechanism that triggers this rotation can be any, as long as the second movable wall is in the first position depicted as a dashed line in FIG. 11 when the reader is not in the cradle 300 to the second position depicted as a solid line in FIG. 11 when the reader is in the cradle and inserted in the first and second seat.

The rotation may take place due to an actuator present in the second seat which compresses a spring or by any other means.

The movements of the first and second movable walls from the first to the second position, and vice-versa, take place at the same time as soon as the reader is docketed/removed from the cradle 300.

Figure 12:
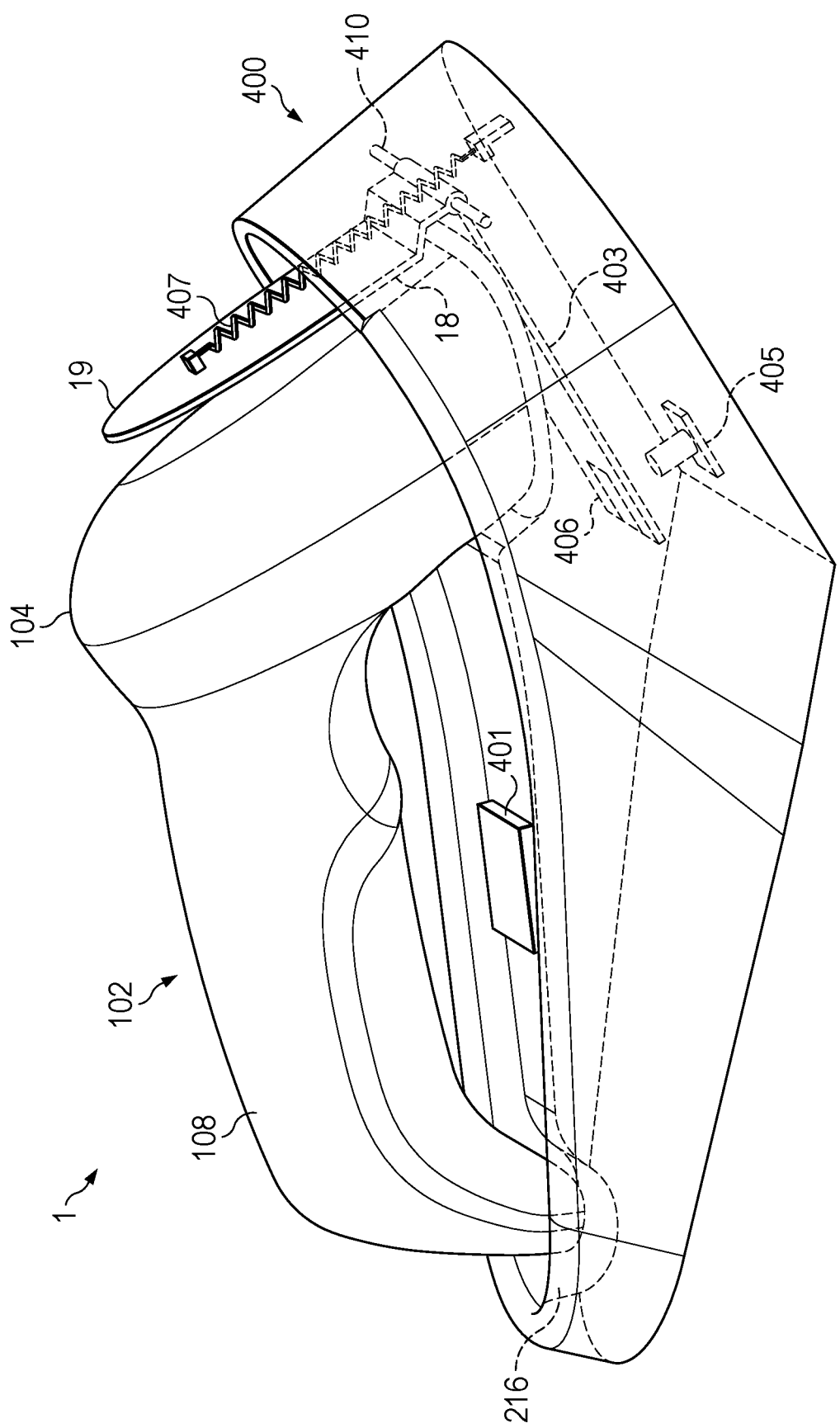
FIG. 12 is a lateral view of a system according to a fourth embodiment of system of the invention.
Figure 13:
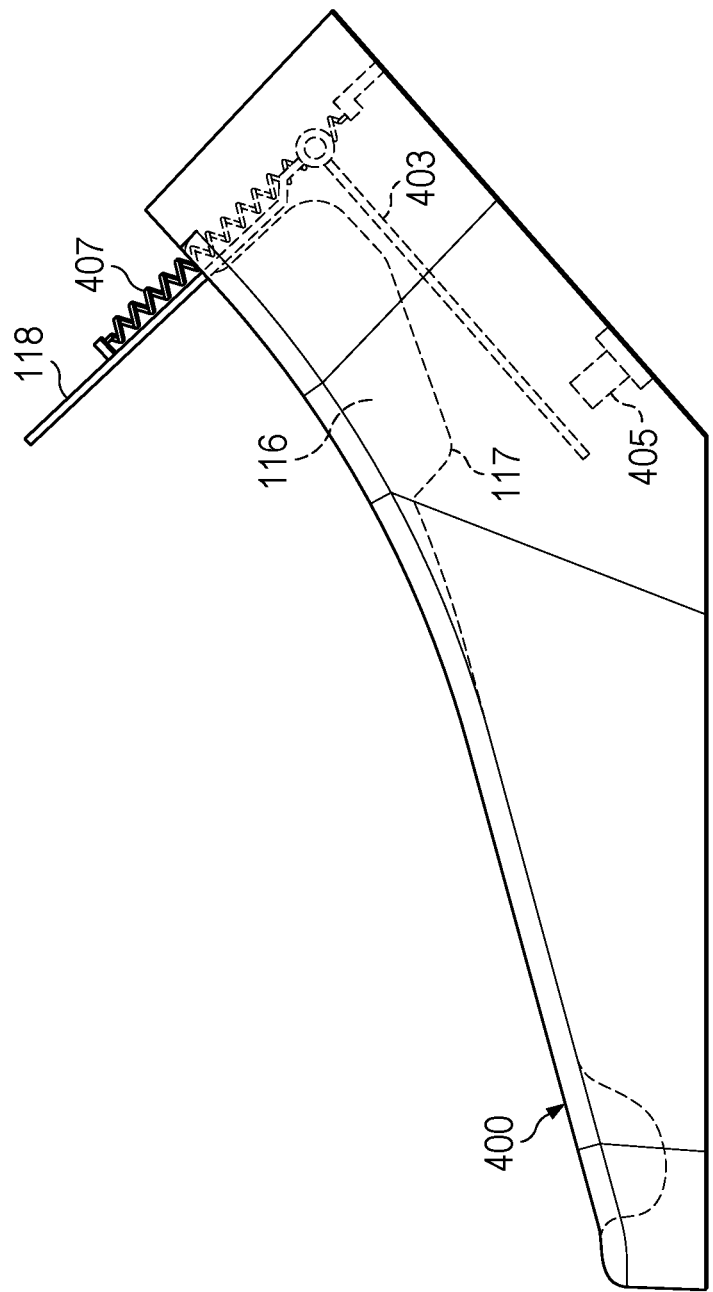
FIG. 13 is a lateral view of a fourth embodiment of the system of FIG. 12 in a first operative position.
Figure 14:
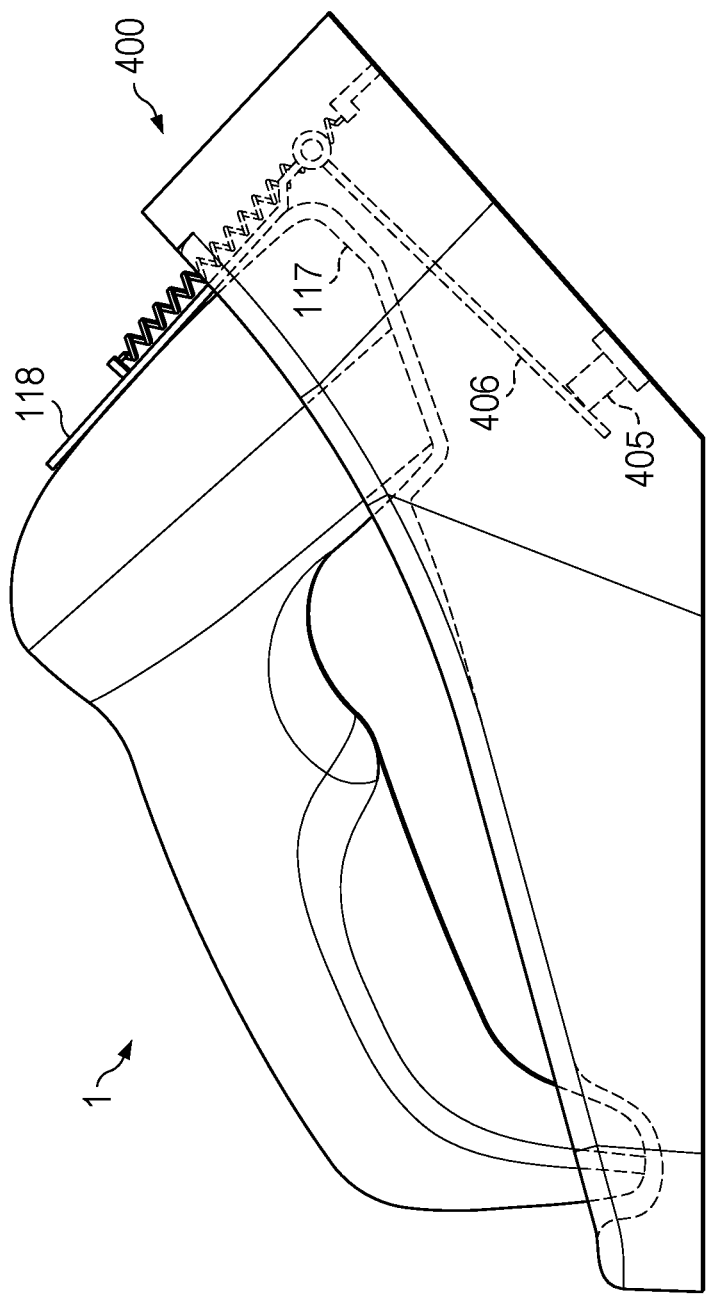
FIG. 14 is a lateral view of the fourth embodiment of the system of FIGS. 12 and 13 in a second operative position.

In a fourth embodiment depicted in FIGS. 12-14, system 1 includes a forth embodiment of cradle 400.

The cradle 400 includes a proximity sensor 401 apt to detect when the reader 102 is approaching the cradle 401. The proximity sensor 401 may be a Hall Effect sensor, an optical sensor, a micro switch; it may be inductive, capacitive, magnetic, etc. The sensor 401 is capable of emitting a signal when an object, such as the reader, is getting closer, i.e. the distance between the object and the cradle 400 is below a given threshold, to the cradle 400.

The cradle 400 includes a base part or portion 112 defining a first seat 116. First seat 116 has a bottom surface 117 which is surrounded by walls 114. Among the walls 114 surrounding the first seat 116, movable wall 118 is present, which is disposed upright and forms an angle with the base part. Wall 118 houses power transmitting coil 101 used to recharge power receiving coil 111 of the reader in a manner known in the art and not further described below. The power transmitting coil 101 may be located within the movable wall 118, or attached to any surface of the same. The geometry of the first seat 116 is such that it can house a portion of the reading head 104, that is, the geometry of the first seat 116 is such that the walls 114 and 118 surrounds the head 104 when the reader is positioned on the cradle 400.

In detail, the movable wall 118 is movable from a first position depicted in FIG. 13, when the reader 102 is away from the cradle 400, to a second position depicted in FIGS. 12 and 14 held when the reader 102 is positioned on the cradle. The motion is a rotation along an axis 410. The axis 410 may be parallel to the bottom surface 117.

The movable wall 118 defines a first and a second axially opposed end 18, 19. The first end 18 is positioned within the base portion 112, while the second end 19 extends away from the base portion 112. The second end 19 is fixed to a plate 403 which forms an angle of about 90° with the movable wall 118. However, any other angle is possible. The rotation axis 410 of the movable wall 118 around which the movable wall 118 rotates to pass from the first to the second operative position and vice-versa coincides with the connecting point between the movable wall 118 and the plate 403. The plate 403 extends within the base portion 112, for example below the bottom surface 117 of the first seat 116. Movable wall 118 and plate 403 forms an L-shaped element rotatable around axis 410 where the two arms of the L join. The rotations and movements of the L-shaped element correspond to the rotations and movements of the movable wall 118.

Further, the cradle 400 includes an electro-mechanic actuator 405, for example an electro-magnet, an electric-motor, a step linear motor, etc. which may have an effect onto the L-shaped element. For example, in the depicted embodiment of FIGS. 12-14, the electro-mechanical actuator is an electromagnet and the cradle 400 further includes a metallic element 406 positioned on the plate 403. The respective positioning of the metallic element 406 on plate 403 and of the electro-mechanic actuator 405 is such that, when the electro-magnet is charged, the magnetic force is capable to act onto the metallic element 406 and to attract the same.

Electro-mechanical actuator 405 is apt to receive signals from proximity sensors 401.

Further, the cradle 400 includes also second seat 216 to partially house a portion of the handle 108 of the reader 102.

Figure 17:
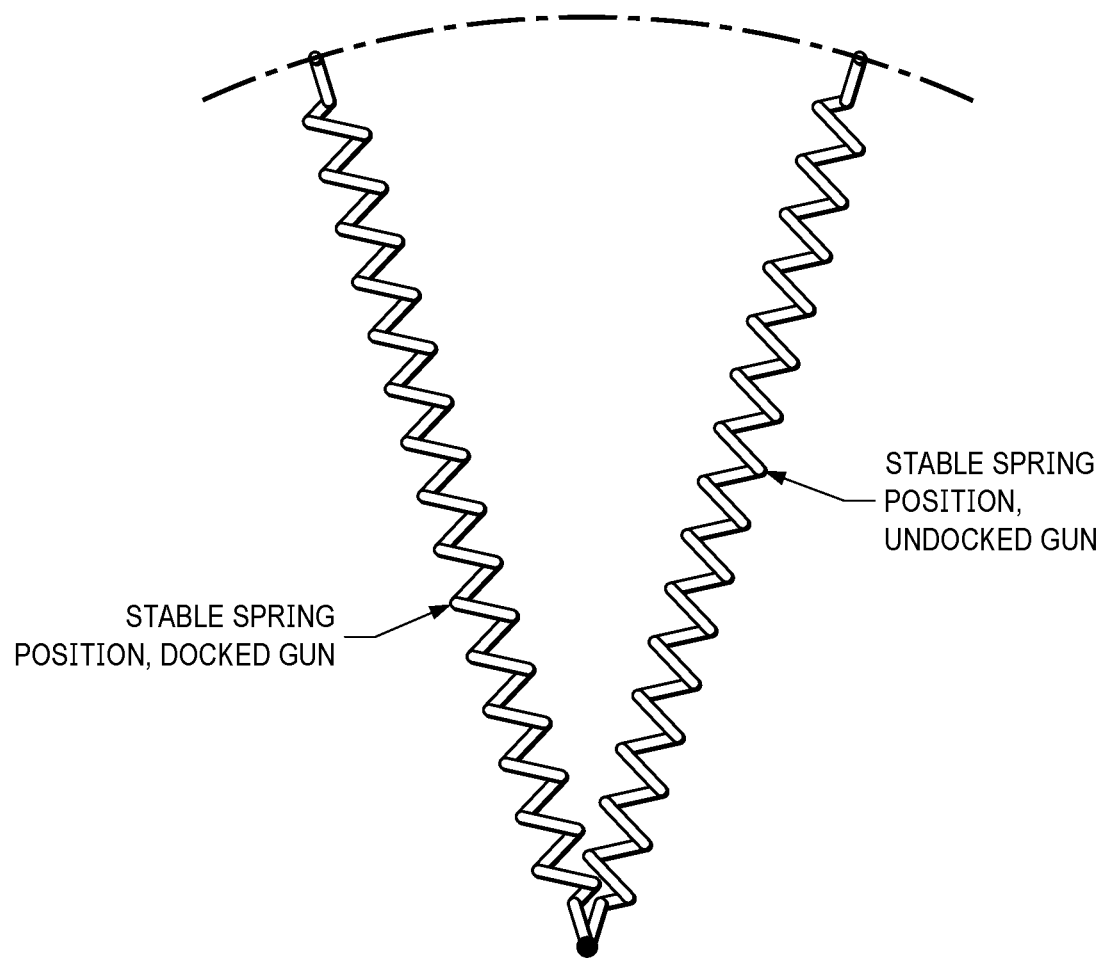
FIG. 17 is a lateral view of a component of the fourth embodiment of the system of FIGS. 12-16.

In addition, cradle 400 includes a spring 407 connecting the second end 19 of the movable wall 118 with base portion 112 of the cradle 400. The spring 407 has a first stable position when the movable wall 118 is in the first operative position and a second stable position when the movable wall is in second operative position. This situation is depicted in FIG. 17. With stable position, it is intended a position towards which the spring 407 tends to return as long as it is moved from the same. Being the spring connected to the movable wall 118, the movable wall 118 is subjected to the spring reactions in its movement. Movement of the walls causes movement of the spring. In the movement from the first to the second position, or vice-versa, the spring 407, which follows movement of the movable wall, is moved from its stable position. The trajectory of the second end 19 of the movable wall is substantially an arc of circumference. Along this trajectory, the spring 407 is not in a stable position. Up to a certain angle in the trajectory, the spring tends to pull the movable wall back to its first operative position. After a certain angle, the closest stable position becomes the second operative position of the movable wall 118 and thus the spring 407 pushes the movable wall 118 towards the second operative position.

When the reader 102 is not in the cradle 400, the cradle is in the position of FIG. 13, where the movable wall 118 forms an angle of 90° or more with the bottom surface 117 of the first seat 116. The electro-magnet 405 is relatively far from the metallic element 406. The spring 407 is in one of the two stable positions of FIG. 17, keeping the movable wall 118 in the first operative position.

When the reader 102 is leant onto the cradle 400, the proximity sensor 401 activates the electro-magnet 405 by energizing it. The magnetic force attracts the metallic element 406 of the plate 403 that generates the rotation of the movable wall 118. At a certain moment, the pulling force is able to overcome the spring 407 force that keeps the movable wall 118 in the first operative position and it makes the spring 507 rotates forming the circumference arc trajectory of FIG. 17, together with the movable wall 118. Once the spring 407 has reached the second stable position, which corresponds to the second operative position of the movable wall 118, where the movable wall 118 is in abutment with the head 104 of the reader 102, the electro-magnet 405 is de-energized and the spring 407 itself pushes the movable wall against the reader head 104. In this position, power transmitting and power receiving coils 101, 111 are aligned and a better power transmission is possible.

To undock the reader 102, its extraction stroke causes the spring 407 to overcome the force keeping it in the second stable position and to rotate, together with the movable wall, back to its first resting position (see again FIG. 17).

Figure 15:
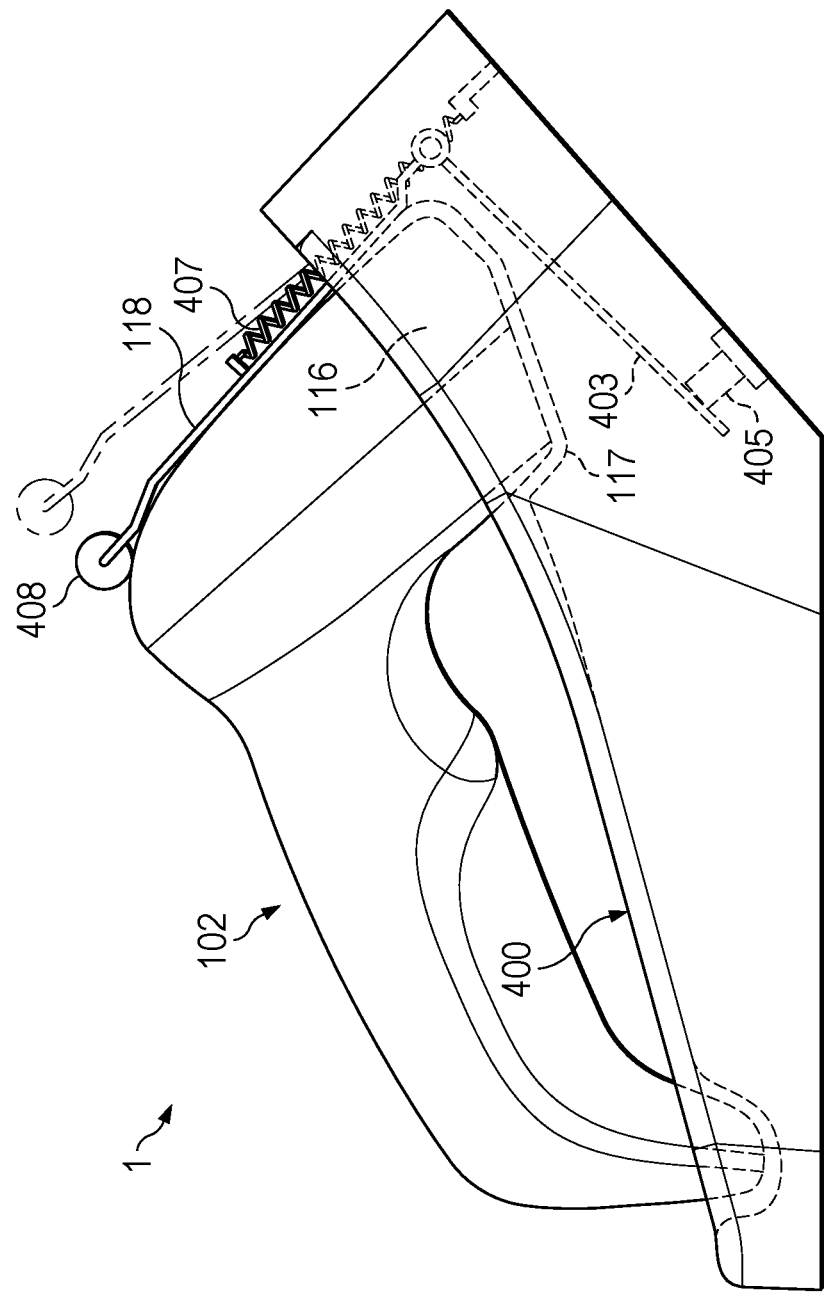
FIG. 15 is a lateral view of a first variant of the fourth embodiment of the system of FIGS. 12-14.
Figure 16:
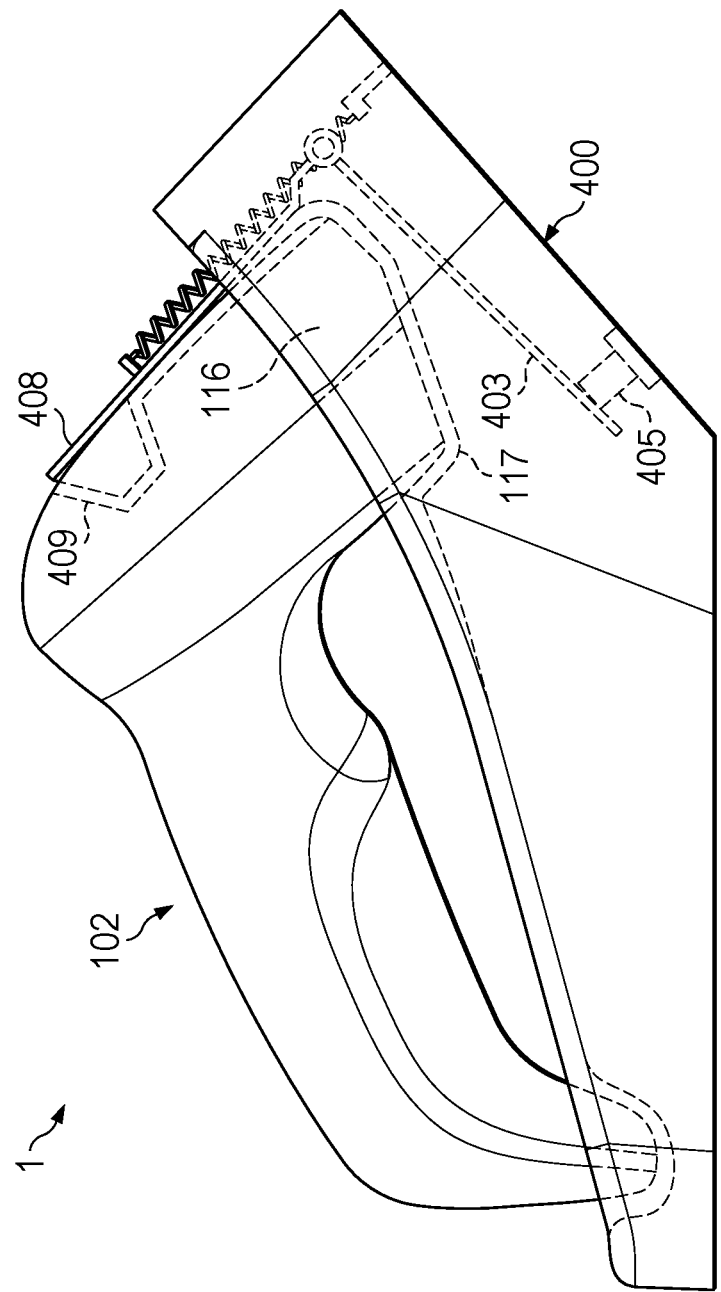
FIG. 16 is a lateral view of a second variant of the fourth embodiment of the system of FIGS. 12-14.

In a first and second variant of the cradle 400, depicted in FIGS. 15 and 16, the second end 19 of the movable wall 118 includes a hook element 408 to better anchor the head 104 of the reader in place, when the movable wall is in the second operative position. The hook element 408 may have a round shape, or may have an edge adapted to be inserted in a corresponding indent, recess or groove 409 formed on the head of the reader 102 (see variant of FIG. 16). This configuration allows a better stability of the reader 102 onto the cradle 400 in case of a vertical or tilted positioning of the cradle 400.

The hook element 408 may be used in any movable wall 118 of the previously depicted embodiments of the cradle (100, 200, 300) as well.

Figure 19:
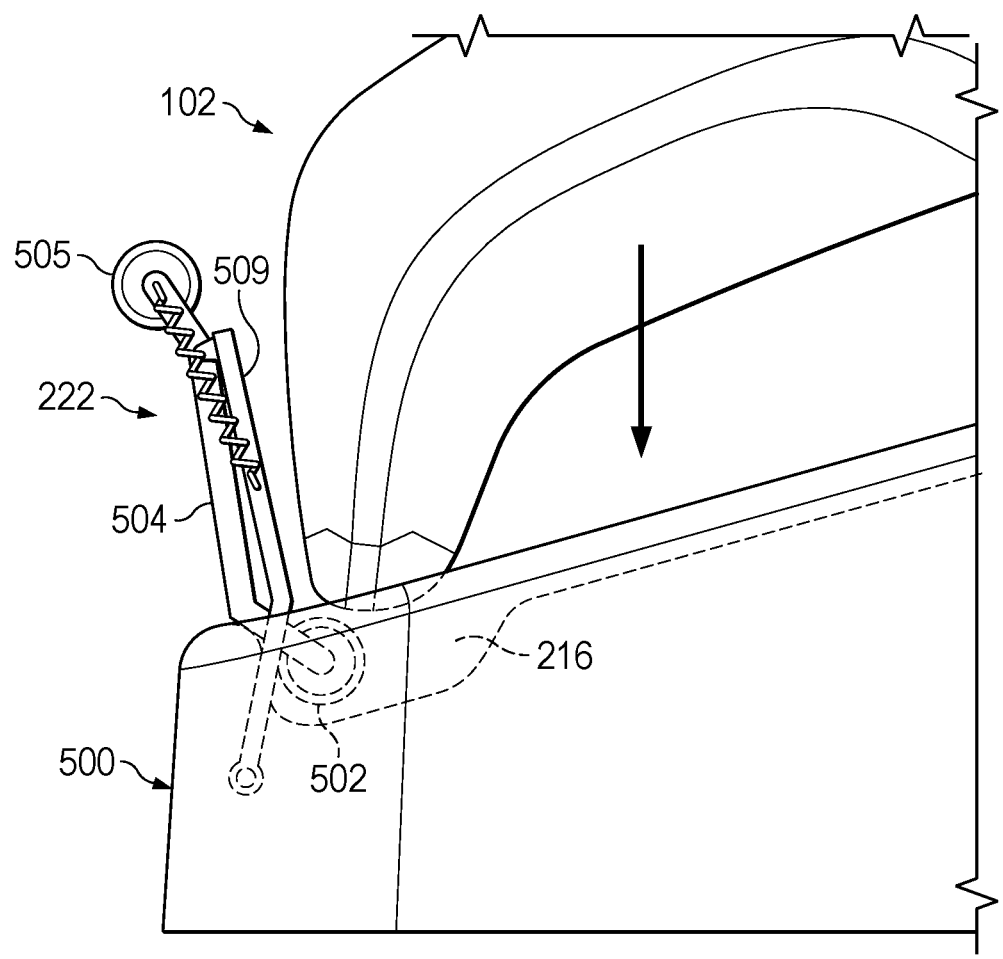
FIG. 19 is a lateral view of a portion of a fifth embodiment of the system of FIG. 18 in an intermediate operative position.
Figure 20:
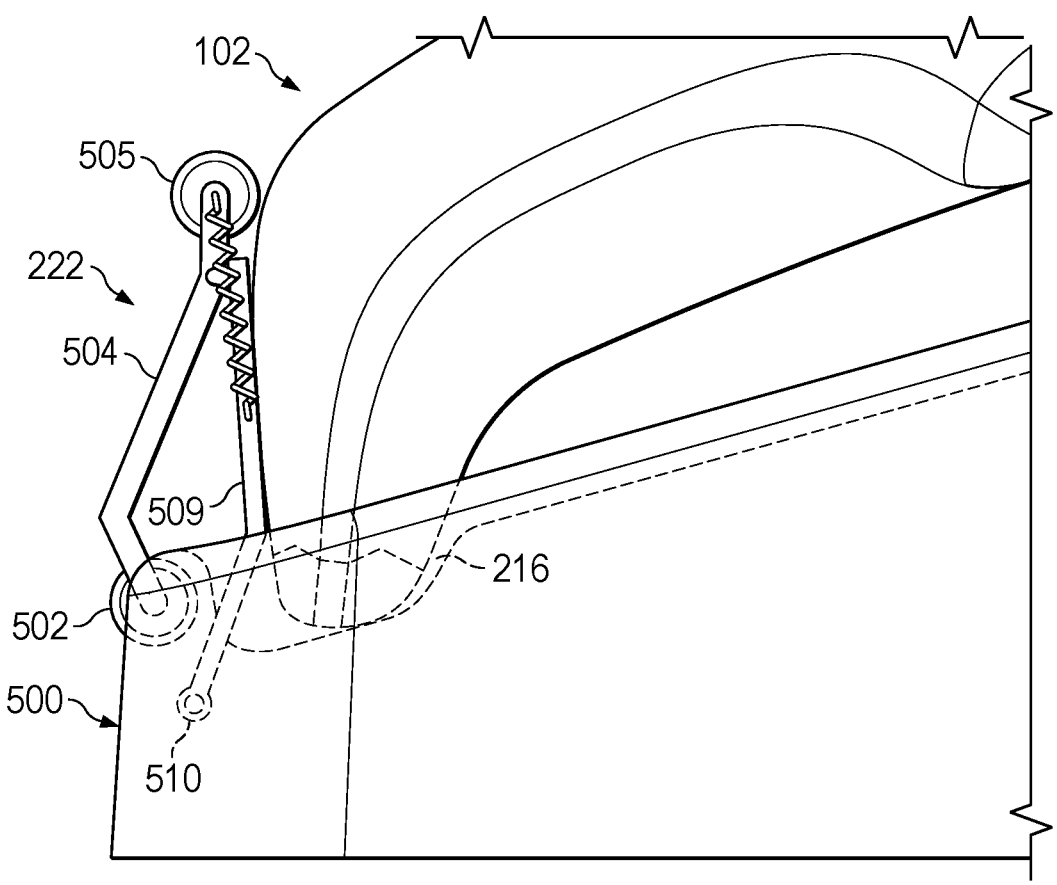
FIG. 20 is a lateral view of a portion of a fifth embodiment of the system of FIGS. 18 and 19 in a second operative position.
Figure 21:
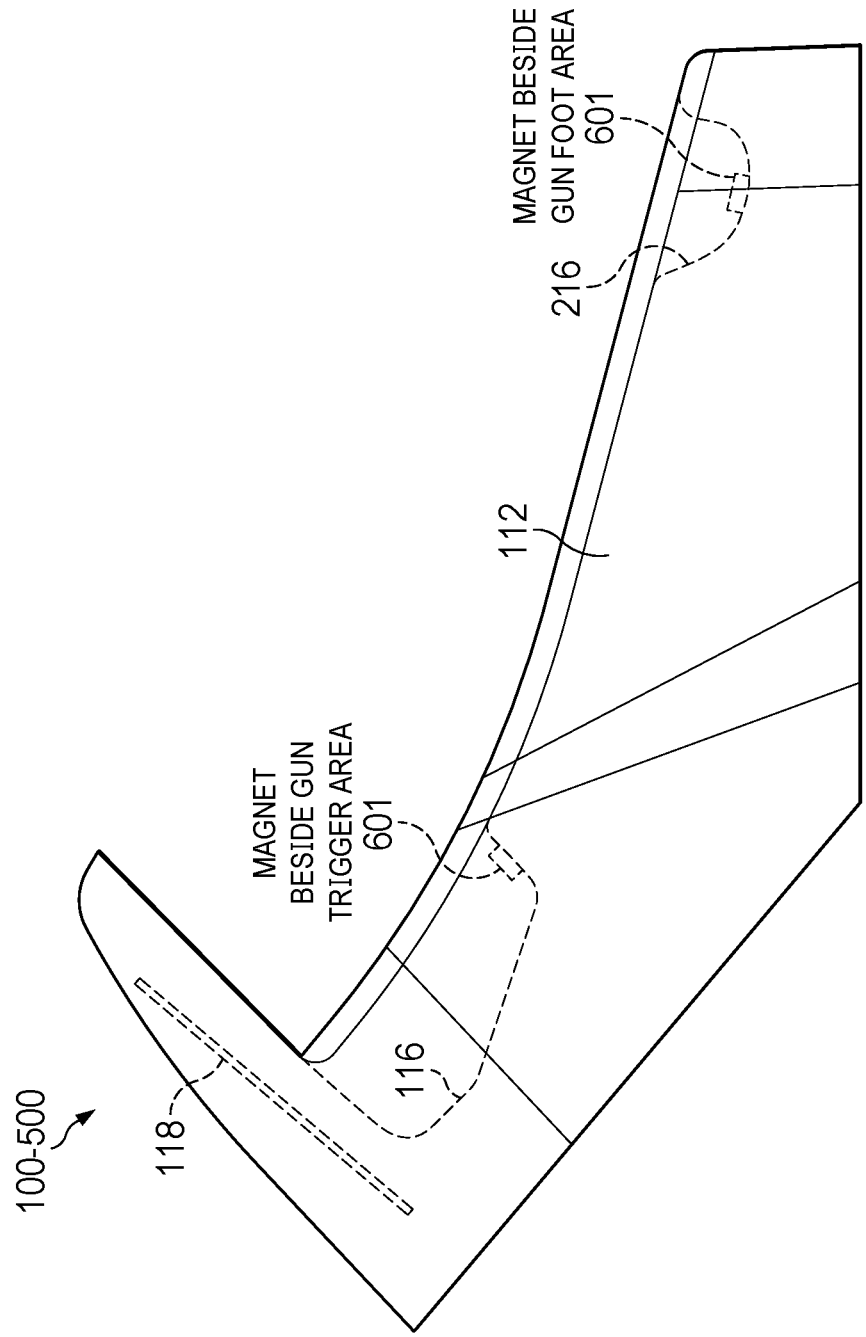
FIG. 21 is a first variant applicable to all embodiments of the system of the invention of FIGS. 1-20.

In FIGS. 19-21, a further embodiment of system 1 including cradle 500 is depicted. A different mechanism to move the movable wall 118 or the second movable wall 222 from the first to the second operative position—and vice-versa—is shown. The FIGS. 19-21 show the movements of the second movable wall 222 in the second seat 216, however the same mechanism can be applied as well for the movement of the movable wall 118 in the first seat 116.

The movement of the second movable wall 222 is a rotation around a given axis 510 located on the base portion 112 of the cradle 500. The rotation is caused by the weight of the portion of the handle 108 of the reader 102 entering in the second seat 216. Alternatively or in addition, the rotation is triggered by a magnet which attracts the movable wall 222 towards the reader 102. As soon as the rotation has taken place from the first to the second position, the movable wall 222 remains in contact to the handle 108 due to a spring 501 action. The action of the spring 501 onto movable wall 222 is identical to the action of spring depicted in FIG. 17 of cradle 400 of FIGS. 12-14.

Figure 18:
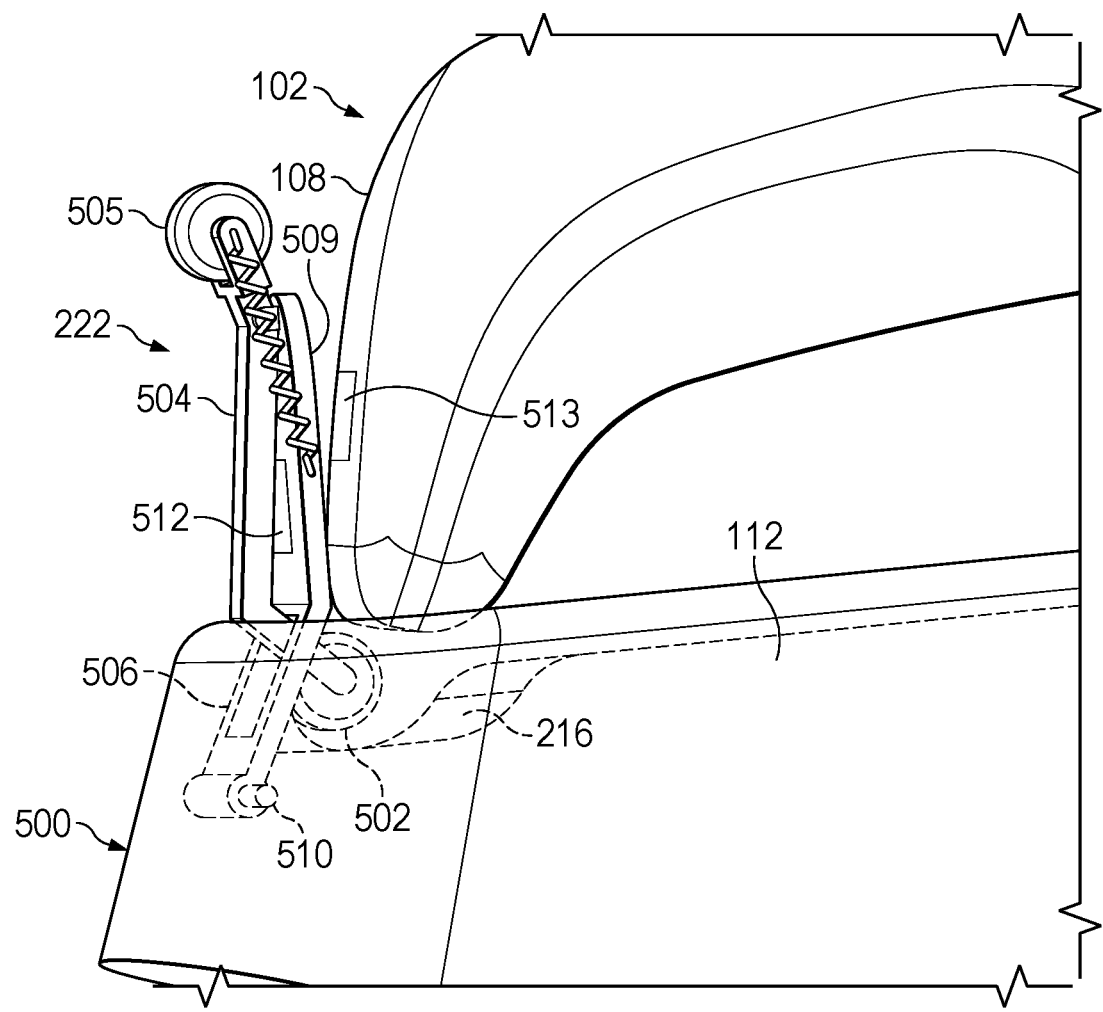
FIG. 18 is a lateral view of a portion of a fifth embodiment of the system of the invention in a first operative position.

The second movable wall 222 includes a lever 504, which is used for blocking and ejecting the reader 102 from second seat 222, having a first and a second distal ends, each end each including a roller, called first and second roller 502, 505. The roller 502 in the first end has the function of an actuator and, in the first operative position (FIG. 18) of the second movable wall 222, it is positioned in the second seat 216. Further, movable wall 222 includes a plate 509 hinged to the base part 112 of cradle 500. The hinge defines rotation axis 510 of the movable wall 222. Plate 509 may include one or more magnets 512. Plate 509 and lever 504 are kept together by spring 501 which is deformed due to the relative movement of plate 509 and lever 504. Spring 501 therefore is connected to plate 509 and lever 504.

When the last part of the handle 108 of the reader 102 is inserted into the second seat 216, the insertion movement depicted in FIG. 19 with an arrow causes both a rotation of the plate 509, for example by means of magnet 512 and a metal part 513 positioned in the reader 102, and a rotation of the blocking/ejection lever 504. The rotation of the lever 504 takes place as follows. The operation of the lever is substantially the functioning of a snap in element. The lower roller 502 present in the second seat 216 is pushed from its original position, due to the reader insertion in the original seat. The movement of the roller 502 causes the movement of the whole lever 504 which rotates.

Movements of the lever 504 and plate 509 cause a movement of the spring 501.

As described with reference to embodiment of cradle 400, the spring 501 at the beginning keeps the movable wall 222 at the first operative position because it is one of its stable positions. As soon as the force pulling the movable wall 222 away from such position is strong enough, the spring overcomes the resistance in its circumference arc trajectory (FIG. 17) and reaches the second stable position. In this second position, the upper roller 505 blocks the reader 102 (FIG. 20), being pushed against the reader 102 by the spring 501, as well as by the magnetic attraction of the magnet/metallic element 512, 513 providing it further stability mainly in vertical or tilted usages of the system 1.

The reader 102 undocking causes the back rotation of the upper roller 505 until the spring 501 overcomes back the resistance in its trajectory. The lower roller 502 is pushed inside the second seat 216 pressing against the lower part of handle 108 and therefore the handle 108 is pushed out of the second seat 216.

The length of the lever 504 generates a relatively high ejection torque.

In all depicted embodiments of system 1, including cradle 100, 200, 300, 400, 500, the cradle and/or the reader 102 may include additional elements.

The first and/or second seat 116, 216 may also be provided with a retaining mechanism, all indicated with 601, shown in FIG. 21, for example one or more lugs or magnets suitable to engage in grooves or attract a ferromagnetic element (not depicted in the drawings) positioned in the reader 102.

This increases the stability of the reader 102 when inserted in the cradle 100-500.

Figure 22:
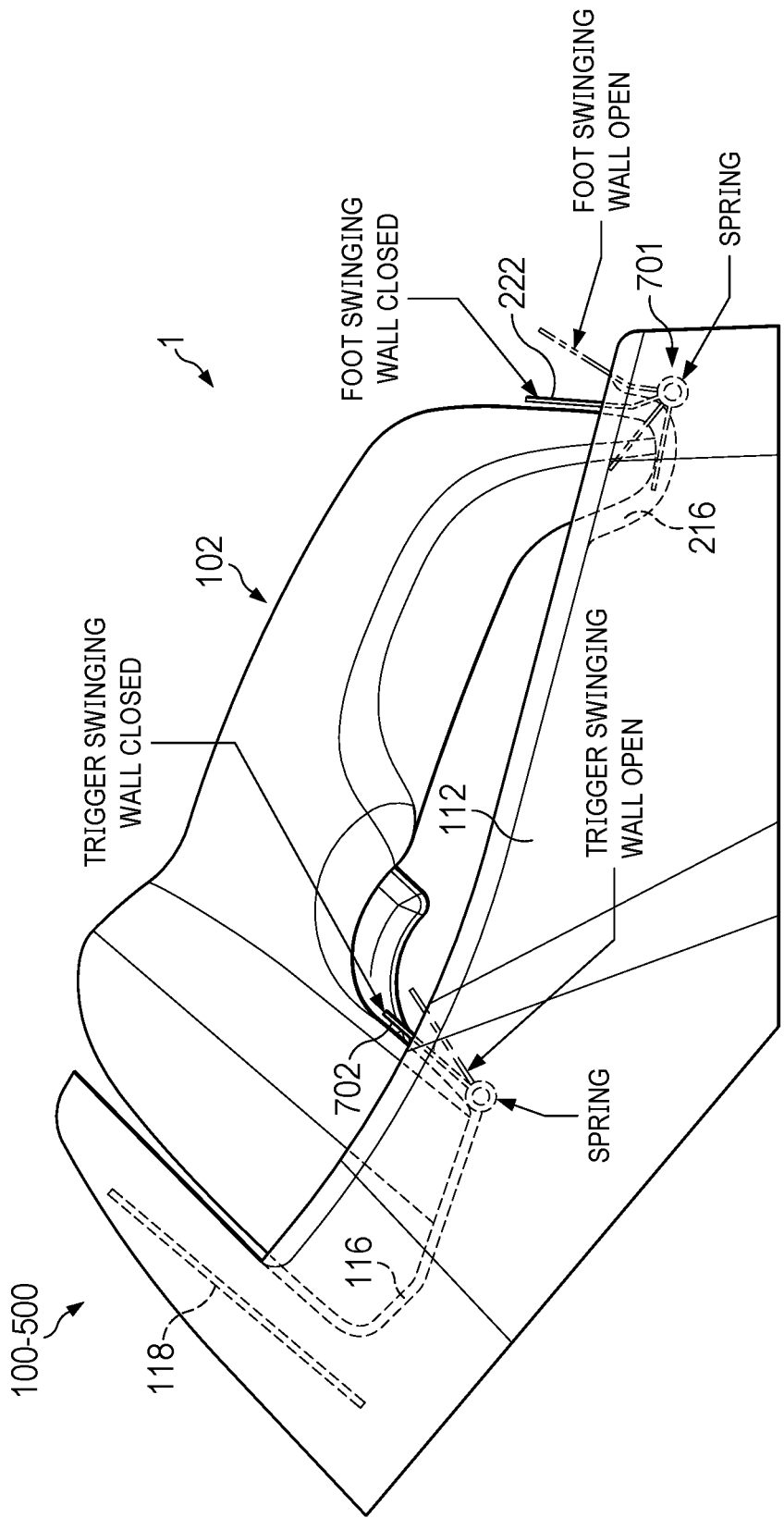
FIG. 22 is a second variant applicable to all embodiments of the system of the invention of FIGS. 1-21.

Further (see FIG. 22), a snap in element 701 may be inserted in the first and or the second seat 116, 216. The snap in element, which may include a spring and a lever (not depicted) having an action similar to the spring 501 and lever 504 of movable wall 222 of the embodiments of FIGS. 18-20 where the lower roller connected to spring "snaps" the wall 222 towards the reader 102 when the reader is inserted in the seat 116, 216. In the same way, the snap in element "snaps" the wall 118, 222 away from the reader 102 when the reader is extracted from the first or second seat 116, 216.

In the first seat 116, besides the movable wall 118 including the power receiving coil 111, a further movable wall 702 may be present, which is moved from a first to a second operative position using an element analog to the snap in element described above. The movement between the first to the second operative position is triggered by the insertion of the head 104 into seat 116.

Figure 23:
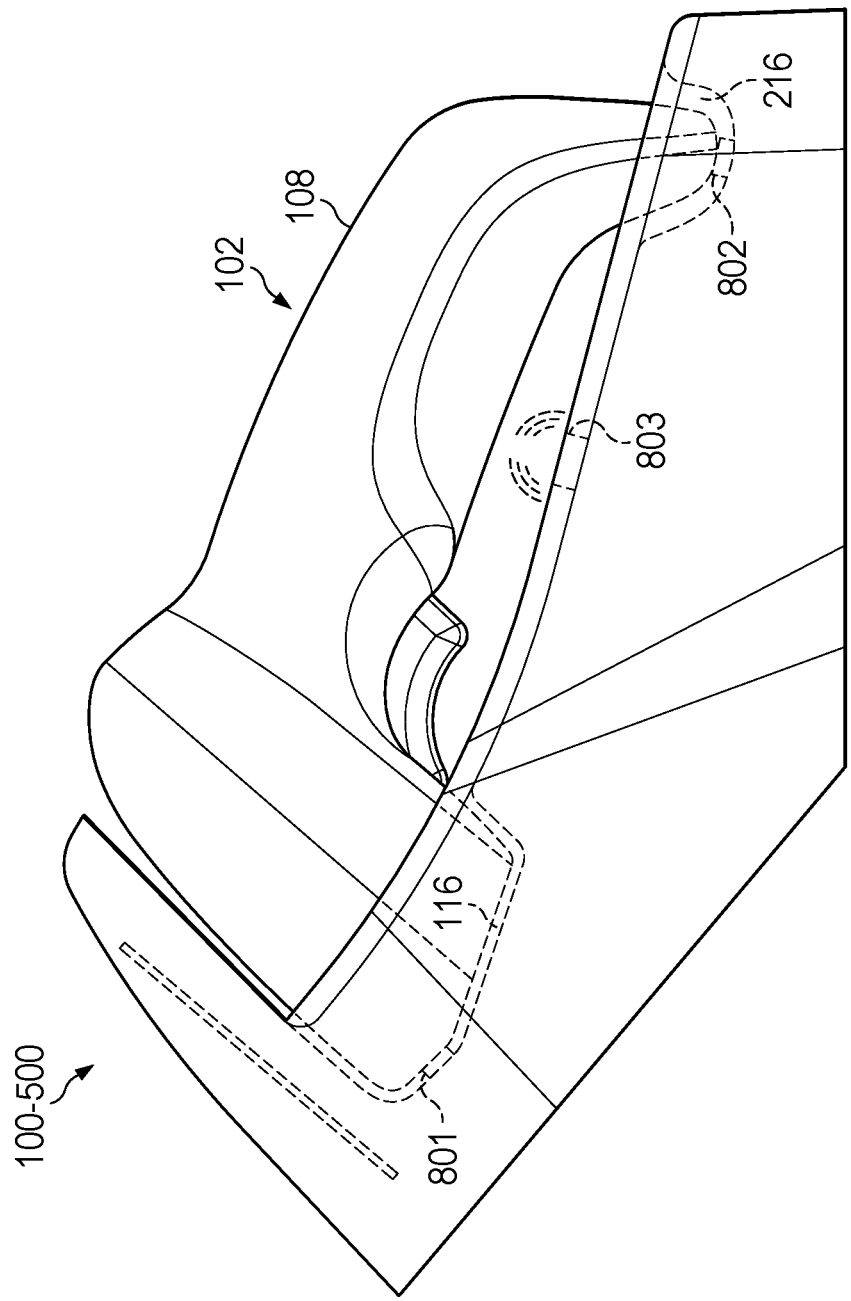
FIG. 23 is a third variant applicable to all embodiments of the system of the invention of FIGS. 1-22.

Further, as depicted in FIG. 23, cradle 100-500 may include one or more proximity sensors, which may include a Hall sensor, an optical sensor, a micro switch, it may be an inductive sensor, magnetic sensor or a combination thereof, fixed on the base part 112 of the cradle 100-500. In the depicted embodiment, three sensors are present, a first sensor 801 located in the first seat 116, a second sensor 802 located in the second seat 216 and a third sensor 803 located in a position in between the two seats, below the handle 108. The handle 108 and the third sensor 803 do not touch, while in the first and second seat 116, 216 the first and second sensors 801, 802 touch the reader 102. Preferably, the third sensor is a capacitive sensor. Each sensor is activated only if there is a close proximity between the reader or the hand of the user and the sensor itself. For example, the third sensor in order to be activated, due to the relatively wide space present between the cradle and the reader, needs the presence of the hand grapping the handle.

The functioning of the cradle of FIG. 23 is as follows. The first, second and third sensors 801, 802, 803 may be activated all at the same time, or only some of them may be activated. Depending on the number and which one of the sensors is activated, the following situations may arise.

All the sensors 801-803 are "off", that is, none of them detects the presence of an object. This situation takes place when the reader 102 is not docketed.

Only one of the three sensors 81-83 is "on" (that is, it detects the presence of an object): it means that the reader 102 is not properly placed onto the cradle (for example there is not a correct insertion of head 104 or end part of handle 108 in the first or second seat 116, 216).

The sensor 801 in the first seat 116 and the second sensor 802 in the second seat 216 are both "on", that is, they detect the presence of an object, while the third sensor 803 is off. This means that the reader is properly docketed on the cradle.

All sensors are "on": this means that the reader is going to be removed from the cradle: the presence of the hand of the user on the handle of the reader has been detected.

Figure 24:
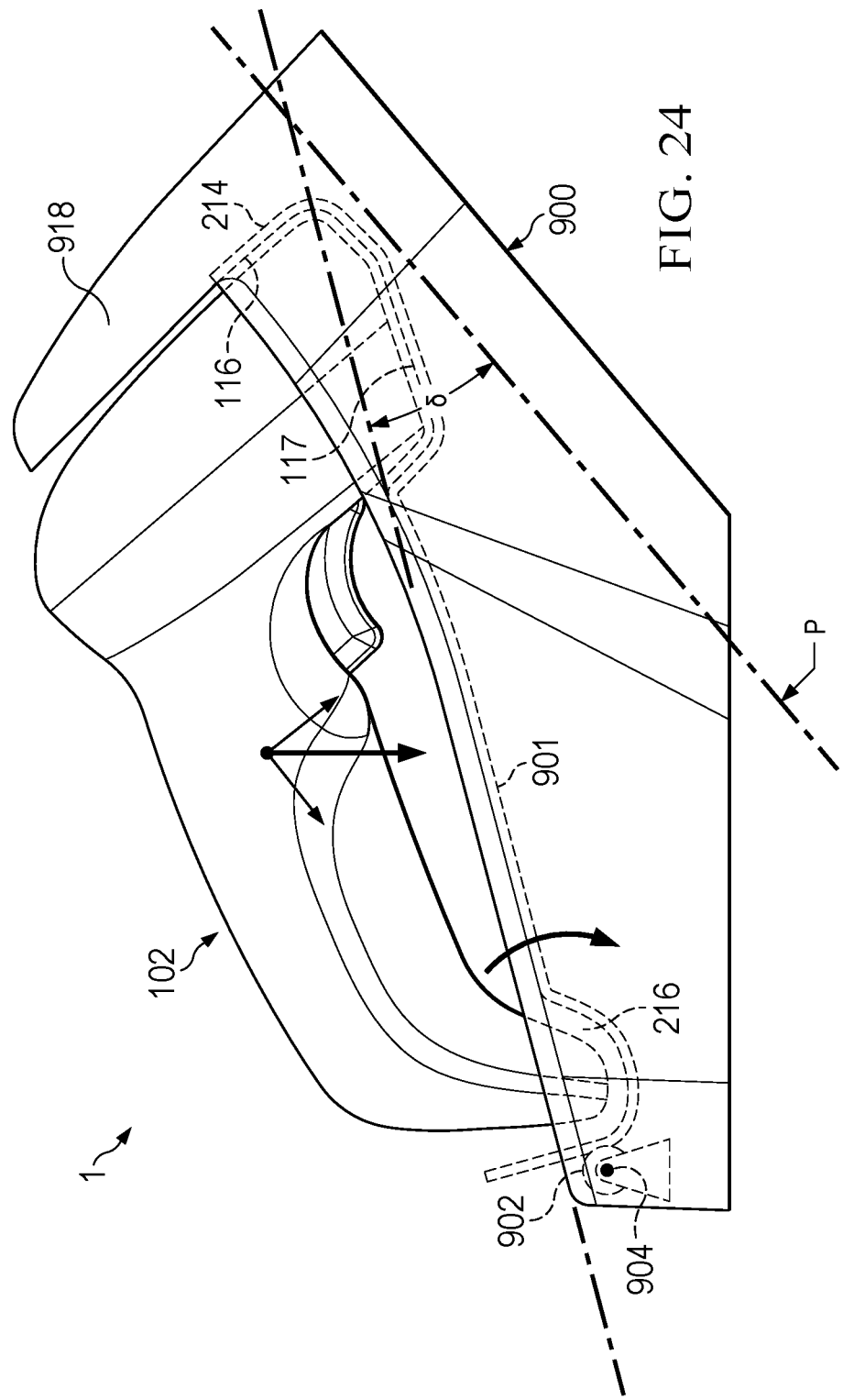
FIG. 24 is a lateral view of a sixth embodiment of the system of the invention.
Figure 25:
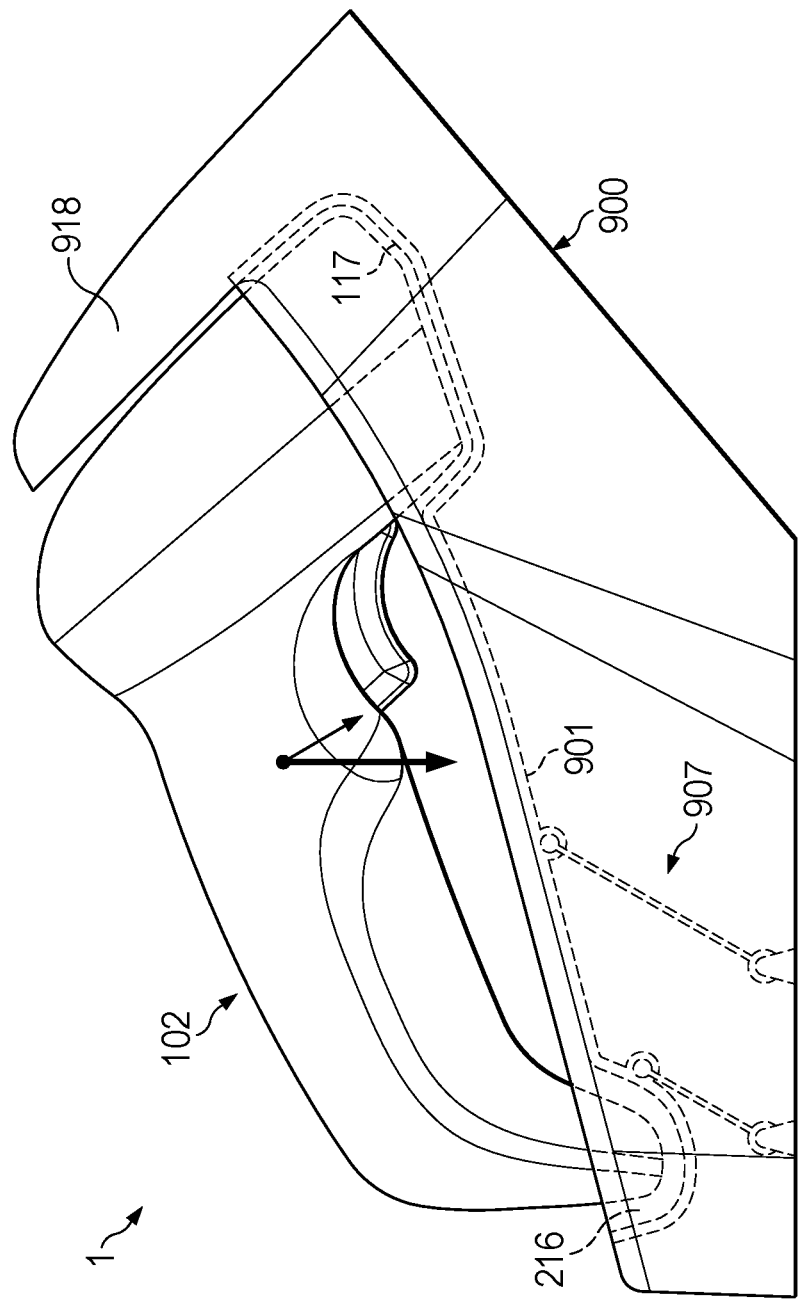
FIG. 25 is a lateral view of a variant of the sixth embodiment of FIG. 24.
Figure 26:
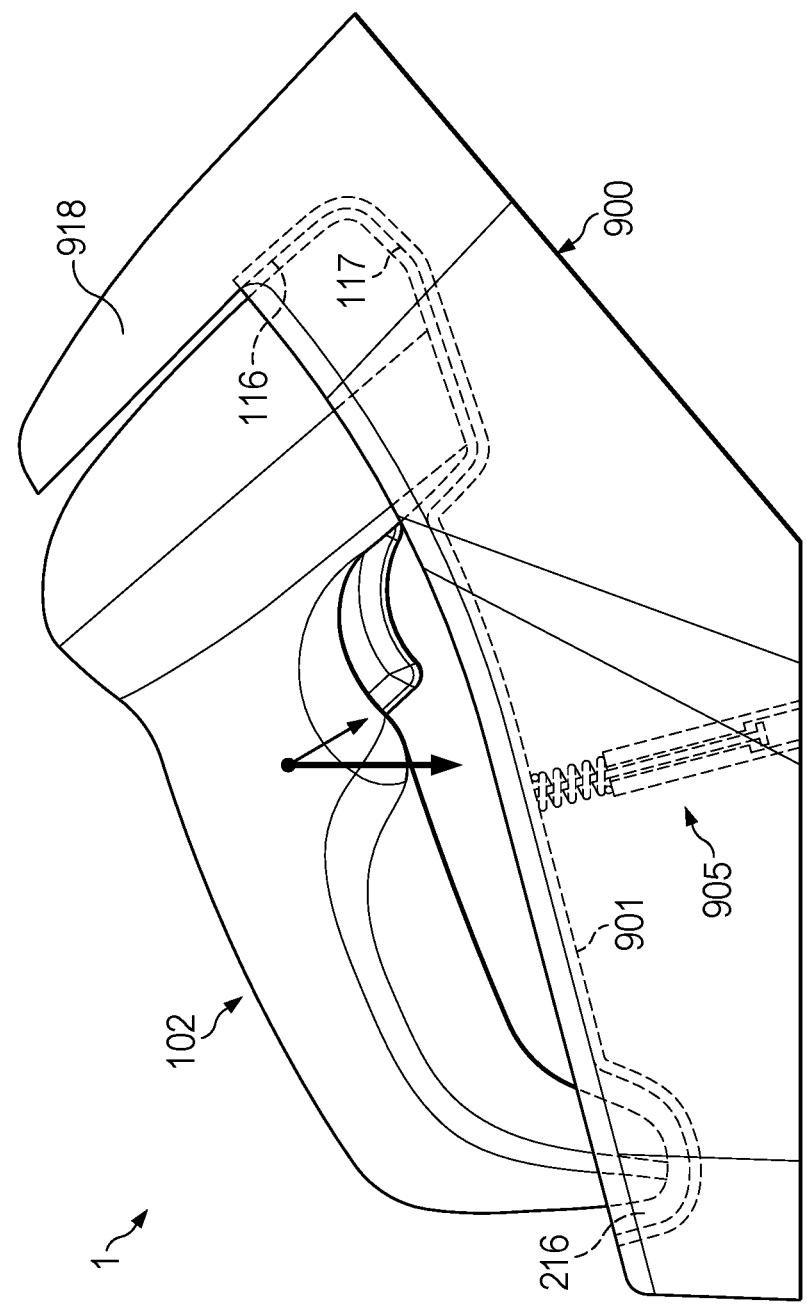
FIG. 26 is a lateral view of a second variant of the sixth embodiment of FIGS. 24 and 25.

In FIGS. 24-26, a sixth embodiment of the invention is depicted. The figures depict three variants of the sixth embodiment of system 1. The system 1 includes cradle 900 and the reader 102. Reader 102 is the same as the reader of embodiments 1-5 of cradles 100-500, therefore reference is made to the previously described embodiments when the elements are the same.

Cradle 900 includes a base part or portion 112 and a base plate 901 movable with respect to the base part 112. The base plate 901 is tray-shaped and includes a first seat 116 to house the head 104 of reader 102. Preferably, the base plate 901 also includes a second seat 216 for housing an end portion of the handle 108.

From the base part 112, a wall 918 housing the power transmitting coil 101 extends. The extension of the wall 918 is substantially perpendicular to the base part 112 or forming a small angle with respect to the perpendicular axis. The power transmitting coil 101 may be located within the wall 918, or attached to any surface of the same.

First seat 116 has a bottom surface 117 which is surrounded by walls 114. The geometry of the first seat 116 is such that it can house a portion of the reading head 104, that is, the geometry of the first seat 116 is such that the walls 114 surrounds the head 104 when the reader is positioned on the cradle 900.

Further, the relative position of the first seat 116 and the wall 918 is such that the wall 918 is positioned at a boundary of the first seat, forming substantially a geometrical continuation of the lateral walls 114 of the first seat 116.

Although in the depicted embodiments the cradle 900 is arranged horizontally, that is, base part 112 as well as bottom surface 117 are substantially horizontal, the cradle 900 may be oriented vertically or inclined with respect to a horizontal or vertical plane.

In detail, the base plate 901 is movable from a first position (not depicted in figures), when the reader 102 is away from the cradle 900, to a second position depicted in FIGS. 24-26 held when the reader 102 is positioned on the cradle 900.

The movement of the base plate 901 is caused by the weight of the reader 102 when position on the cradle 900. In all variants of FIGS. 24-26, the cradle 900 further comprises a biasing element 902 which pushes the base plate 901 back in the first position when the base plate 901 is in the second position and the reader 102 is removed from the cradle 900. In other words, the biasing element 902 acts with a biasing force onto the base plate 901 so that, as soon as the weight of the reader 102 is removed from the cradle 900, the base plate 901 moves back to the first position.

The movement from the first to the second position is either a translation or a rotation or a combination of the two (roto-translation).

In the second position, the reader 102—positioned on the base plate 901—is moved with respect to the original first position due to its weight. The reader therefore in the movement of the base plate changes position with respect to the wall 918 housing the power transmitting coil 101. The system 1 is so designed that the end configuration, that is, the second position of the base plate 901, is such that a good alignment between the power receiving and power transmitting coil 111, 101 is obtained.

In the variant of FIG. 24, the movement from the first to the second position of the base plate 901 is a rotation around an axis 904. The location of the axis of rotation is on the base part 112 at the second seat 216. Therefore the base plate including first and second seats rotates around axis 904. In the first position, the base plate 901 forms an angle γ (not depicted in the drawings) with a plane P passing through the bottom 917 of the cradle. When the reader is positioned on the base plate 901, the base plate rotates around axis 904 due to the weight of the reader and forms a smaller angle δ (with δ<γ) with plane P.

The biasing element 902 includes a spring (not shown) positioned at the axis 904 which is compressed during the rotation.

In a second variant of this embodiment shown in FIG. 25, the movement of the base plate 901 is obtained by a four bar linkage mechanism 907, so that the base plate substantially roto-translate. The principle is as in the first variant, that is, starting from the first position, as soon as the reader is positioned on the base plate 901, the base plate 901 moves and reaches the second position, forcing the reader 102 to move as well. The position is reached by substantially a roto-translation of the base plate. In the second position, the power receiving and power transmitting coils 111, 101 are aligned. Preferably, the biasing element 902 also includes springs (not shown) which, when the reader is removed from the cradle 900, spring (not depicted) pushes the base plate 901 back in the original position.

In the variant of FIG. 26, the base plate 901 is movable by a sliding mechanism, similar to the sliding element 3203 described with reference to FIGS. 5-8. Also in this case a spring is preferably present to push the base plate back to the first position.

The invention claimed is:

1. A cradle for wireless power recharging of an optical information reader including a first portion containing a power receiving coil to be charged, the cradle including:
 a first seat adapted to partially house the first portion of the optical information reader, the first seat having a plurality of walls, one of the walls being movable from a first operative position held when the first portion of the optical information reader is not inserted in the first seat to a second operative position held when the first portion of the optical information reader is inserted in the first seat, wherein movement from the first operative position to the second operative position includes a rotation of the movable wall; and
 a power transmitting coil located at the movable wall which is adapted to transmit power to the power receiving coil when the optical information reader is inserted in the first seat and the movable wall is in the second operative position.

2. The cradle according to claim 1, wherein in the second operative position, the movable wall is adapted to be in contact with the first portion of the optical information reader including the power receiving coil.

3. The cradle according to claim 1, wherein in the second operative position, the movable wall is adapted to be aligned with a part of the first portion of the optical information reader including the power receiving coil.

4. The cradle according to claim 1, wherein the first seat includes a bottom surface to which the first portion of the optical information reader is in abutment when the optical information reader is inserted into the first seat and wherein the movable wall is rotatable around an axis parallel to the bottom surface.

5. The cradle according to claim 1, wherein the movable wall is connected to a spring mechanism, the spring mechanism being in a first and second stable configuration in both the first and second operative positions of the movable wall, the spring mechanism reaching a loaded configuration where it is biased to return to the first or second stable configuration, the loaded configuration being reached when the spring moves from the first to the second stable configurations, or vice-versa, due to the movable wall change from the first to the second operative position, or vice-versa.

6. The cradle according to claim 1, wherein the cradle includes a second seat to house a second portion of the optical information reader, and wherein the second seat includes a plurality of walls, one of the walls of the second seat being movable from a first operative position when the second portion of the optical information reader is not inserted in the second seat to a second operative position when the second portion of the optical information reader is inserted in the second seat.

7. The cradle according to claim 1, wherein the cradle includes a second seat to house a second portion of the optical information reader, and wherein the first and/or second seat includes a magnet or a metallic element and the first and/or second portion of the optical information reader includes a corresponding metallic element or magnet.

8. A cradle for wireless power recharging of an optical information reader including a first portion containing a power receiving coil to be charged, the cradle including:
 a first seat adapted to partially house the first portion of the optical information reader, the first seat having a plurality of walls, one of the walls being movable from a first operative position held when the first portion of the optical information reader is not inserted in the first seat to a second operative position held when the first portion of the optical information reader is inserted in the first seat; and
 a power transmitting coil located at the movable wall which is adapted to transmit power to the power receiving coil when the optical information reader is inserted in the first seat and the movable wall is in the second operative position, wherein one of the first portion of the optical information reader and the movable wall includes a magnet and the other of the first portion of the optical information reader and the movable wall includes a metal element so that the movement of the movable wall from the first to the second operative position is due to magnetic attraction.

9. A cradle for wireless power recharging of an optical information reader including a first portion containing a power receiving coil to be charged, the cradle including:
a first seat adapted to partially house the first portion of the optical information reader, the first seat having a plurality of walls, one of the walls being movable from a first operative position held when the first portion of the optical information reader is not inserted in the first seat to a second operative position held when the first portion of the optical information reader is inserted in the first seat; and
a power transmitting coil located at the movable wall which is adapted to transmit power to the power receiving coil when the optical information reader is inserted in the first seat and the movable wall is in the second operative position, wherein the cradle includes a snap in element connected to the movable wall, the movement from the first to the second operative position of the movable wall being triggered by an actuation of the snap in element.

10. A cradle for wireless power recharging of an optical information reader including a first portion containing a power receiving coil to be charged, the cradle including:
a first seat adapted to partially house the first portion of the optical information reader, the first seat having a plurality of walls, one of the walls being movable from a first operative position held when the first portion of the optical information reader is not inserted in the first seat to a second operative position held when the first portion of the optical information reader is inserted in the first seat;
a power transmitting coil located at the movable wall which is adapted to transmit power to the power receiving coil when the optical information reader is inserted in the first seat and the movable wall is in the second operative position; and
a proximity sensor to detect the vicinity of the optical information reader and an electrically driven actuator connected to the movable wall, the proximity sensor being apt to send signals to the electrically driven actuator to initiate the movement of the movable wall from the first to the second operative position when the optical information reader approaches the cradle.

11. A cradle for wireless power recharging of an optical information reader including a first portion containing a power receiving coil to be charged, the cradle including:
a first seat adapted to partially house the first portion of the optical information reader, the first seat having a plurality of walls, one of the walls being movable from a first operative position held when the first portion of the optical information reader is not inserted in the first seat to a second operative position held when the first portion of the optical information reader is inserted in the first seat; and
a power transmitting coil located at the movable wall which is adapted to transmit power to the power receiving coil when the optical information reader is inserted in the first seat and the movable wall is in the second operative position, wherein the movable wall includes a hook element, and the optical information reader includes a corresponding concavity, so that in the second position of the movable wall, the hook is housed in the corresponding concavity to stabilize a coupling between the power transmitting and power receiving coils.

12. The cradle according to claim 11, wherein the cradle includes:
a base plate on which the optical information reader is positioned, the base plate including the first seat;
a slidable element connected to the base plate so that the slidable element and the base plate move from a first unloaded position when the optical information reader is not on the cradle to a second loaded position when the optical information reader is on the cradle; and
an actuator adapted to rotate or translate the movable wall, the slidable element being connected to the actuator so that the movable wall and is rotated or translated from the first to the second operative position when the slidable element and the base plate are moved from the first unloaded position into the second loaded position.

13. A cradle for wireless power recharging of an optical information reader including a first portion containing a power receiving coil to be charged, the cradle including:
a first seat adapted to partially house the first portion of the optical information reader, the first seat having a plurality of walls, one of the walls being movable from a first operative position held when the first portion of the optical information reader is not inserted in the first seat to a second operative position held when the first portion of the optical information reader is inserted in the first seat; and
a power transmitting coil located at the movable wall which is adapted to transmit power to the power receiving coil when the optical information reader is inserted in the first seat and the movable wall is in the second operative position; and
a control system adapted to detect the presence or absence of the first portion of the optical information reader in the first seat.

14. The cradle according to claim 13, wherein the cradle includes a second seat adapted to partially house a second portion of the optical information reader, and wherein the control system is adapted to detect the presence or absence of the second portion of the optical information reader in the second seat.

15. A cradle for an optical information reader, the optical information reader including a first portion comprising a power receiving coil, the cradle including:
a stationary base part including a wall housing a power transmitting coil which is adapted to inductively transmit power to the power receiving coil when the first portion of the optical information reader is inserted in a first seat;
the first seat apt to partially house the first portion of the optical information reader, the first seat having a plurality of seat walls;
a base plate comprising the first seat, the base plate being adapted to move with respect to the stationary base part from a first operative position held when the optical information reader is not inserted in the first seat to a second operative position held when the optical information reader is inserted in the seat, the movement from the first to the second operative position being caused by the action of the weight of the optical information reader on the base plate; and
a biasing element movable from an unloaded position when the optical information reader is not inserted in the first seat to a loaded position when the optical information reader is inserted in the first seat, and for restoring the base plate to its first operative position when the optical information reader is lifted from the first seat, wherein the base plate is rotatably connected to the cradle.

16. The cradle according to claim 15, wherein the wall housing the power receiving coil is located at a boundary of the first seat.

17. The cradle according to claim 16, wherein the wall housing the power receiving coil is a geometrical continuation of one or more seat wall of the first seat.

18. A system to charge an optical information reader, the system comprising:
a cradle for wireless power recharging the optical information reader, the cradle including:
a first seat adapted to partially house the first portion of the optical information reader, the first seat having a plurality of walls, one of the walls being movable from a first operative position held when the first portion of the optical information reader is not inserted in the first seat to a second operative position held when the first portion of the optical information reader is inserted in the first seat, wherein movement from the first operative position to the second operative position includes a rotation of the movable wall; and
a power transmitting coil located at the movable wall which is adapted to transmit power to the power receiving coil when the optical information reader is inserted in the first seat and the movable wall is in the second operative position; and
the optical information reader including the first portion to be partially housed in the first seat of the cradle, the first portion including the power receiving coil.

19. The system according to claim 18, wherein one of the first portion of the optical information reader and the movable wall includes a magnet and the other of the first portion of the optical information reader and the movable wall includes a metal element so that the movement of the movable wall from the first to the second operative position is due to magnetic attraction.

20. The system of claim 18, wherein the movable wall includes a plate hinged to a base part of the cradle defining a rotation of axis of the movable wall.

* * * * *